United States Patent
Takahashi et al.

(10) Patent No.: US 7,388,898 B2
(45) Date of Patent: Jun. 17, 2008

(54) COMMUNICATION DEVICE

(75) Inventors: Yoshihisa Takahashi, Kanagawa (JP); Takayasu Muto, Kanagawa (JP)

(73) Assignee: Sony Corporation, Tokyo (JP)

( * ) Notice: Subject to any disclaimer, the term of this patent is extended or adjusted under 35 U.S.C. 154(b) by 726 days.

(21) Appl. No.: 10/785,822

(22) Filed: Feb. 24, 2004

(65) Prior Publication Data
US 2004/0165649 A1    Aug. 26, 2004

(30) Foreign Application Priority Data
Feb. 25, 2003    (JP)    .......................... P2003-048075

(51) Int. Cl.
H04B 1/00    (2006.01)
(52) U.S. Cl. ...................... 375/140; 375/150
(58) Field of Classification Search ................ 375/137, 375/145, 149, 260, 140, 150–153, 316, 354; 342/99–103
See application file for complete search history.

(56) References Cited

U.S. PATENT DOCUMENTS

| 5,016,257 | A |   | 5/1991  | Wolf et al. |
|-----------|---|---|---------|-------------|
| 5,184,084 | A |   | 2/1993  | Yun |
| 5,432,521 | A |   | 7/1995  | Siwiak et al. |
| 5,594,453 | A |   | 1/1997  | Rodal et al. |
| 5,742,207 | A |   | 4/1998  | Rambo et al. |
| 5,930,244 | A | * | 7/1999  | Ariyoshi et al. ............ 370/335 |
| 2002/0037029 | A1 | * | 3/2002 | Shimizu et al. ............. 375/148 |
| 2002/0039381 | A1 | * | 4/2002 | Dooley et al. .............. 375/147 |
| 2003/0215005 | A1 | * | 11/2003 | Kontola et al. ............. 375/149 |
| 2004/0203865 | A1 | * | 10/2004 | Krasner .................... 455/456.1 |

FOREIGN PATENT DOCUMENTS

| WO | WO 87 01540 | 3/1987 |
|----|-------------|--------|
| WO | WO 98/34347 | 8/1998 |

* cited by examiner

*Primary Examiner*—Chieh M. Fan
*Assistant Examiner*—Jason M. Perilla
(74) *Attorney, Agent, or Firm*—Frommer Lawrence & Haug LLP; William S. Frommer; Thomas F. Presson

(57) ABSTRACT

A communication device, able to establish synchronization of frequency and able to continuously track a carrier even if an oscillation frequency of an oscillator changes. The device changes the oscillation frequency of a reference frequency oscillator according to established protocols when the base station of the other party in communication changes by generating a frequency change signal for reporting that the base station has changed and the frequency is changed and outputting it to a control unit of a GPS baseband unit.

4 Claims, 21 Drawing Sheets

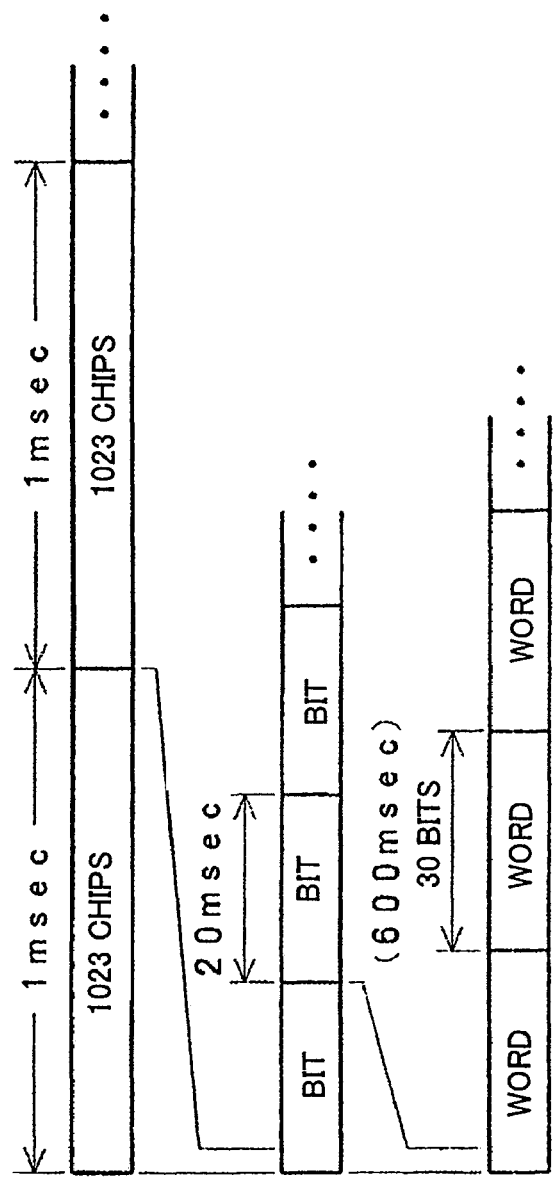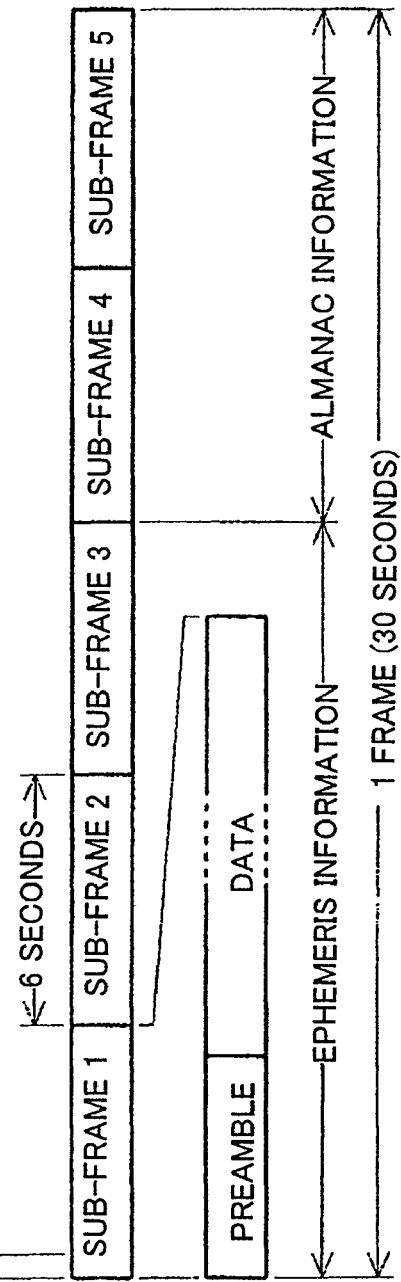

EXPLANATION OF FREQUENCY SEARCH

FIG. 8
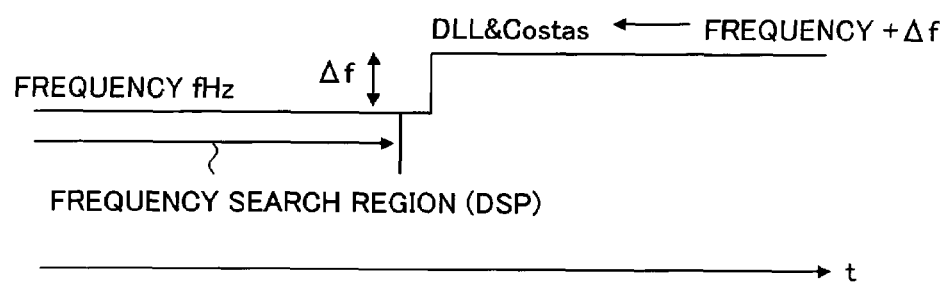
FREQUENCY SEARCH REGION (DSP)
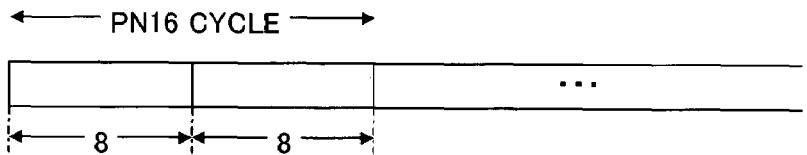
FIG. 9A
FIG. 9B  A  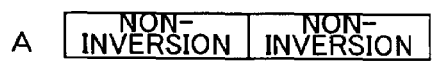
FIG. 9C  B  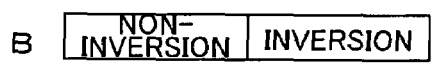
FIG. 9D
NAVIGATION MESSAGE         BIT TRANSITION 0 : 000...000 → −1
0.5 : 010...000 → 0
1 : 100...000 → 1
} 22bit a, b ARE POWER OF 2
(MULTIPLICATION IS SHIFT OPERATION)

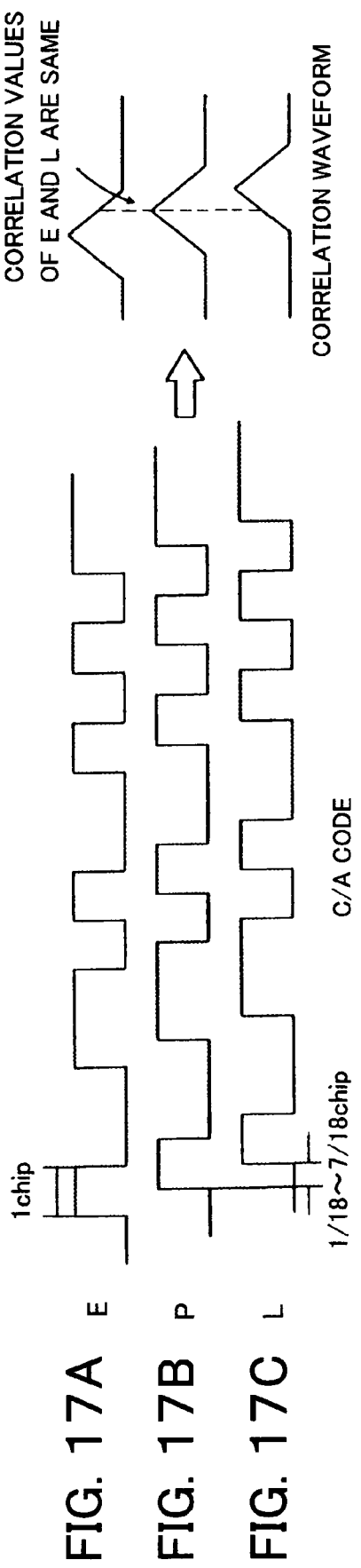
FIG. 17A E
FIG. 17B P
FIG. 17C L

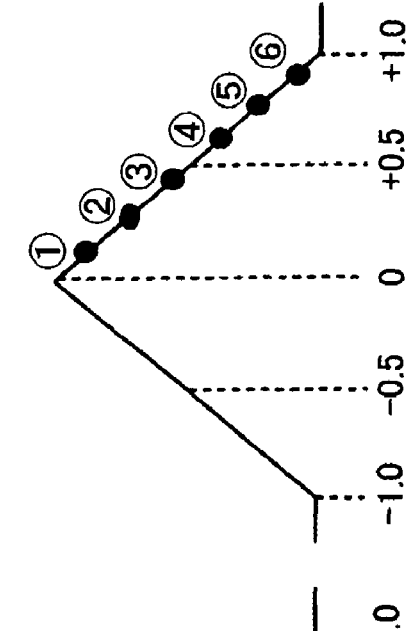
FIG. 22A  CASE WHERE IT CAN BE CORRECTLY ESTIMATED
FIG. 22B  CASE WHERE IT IS DEVIATED BY −0.5 CHIP
FIG. 22C  CASE WHERE IT IS DEVIATED BY +0.5 CHIP

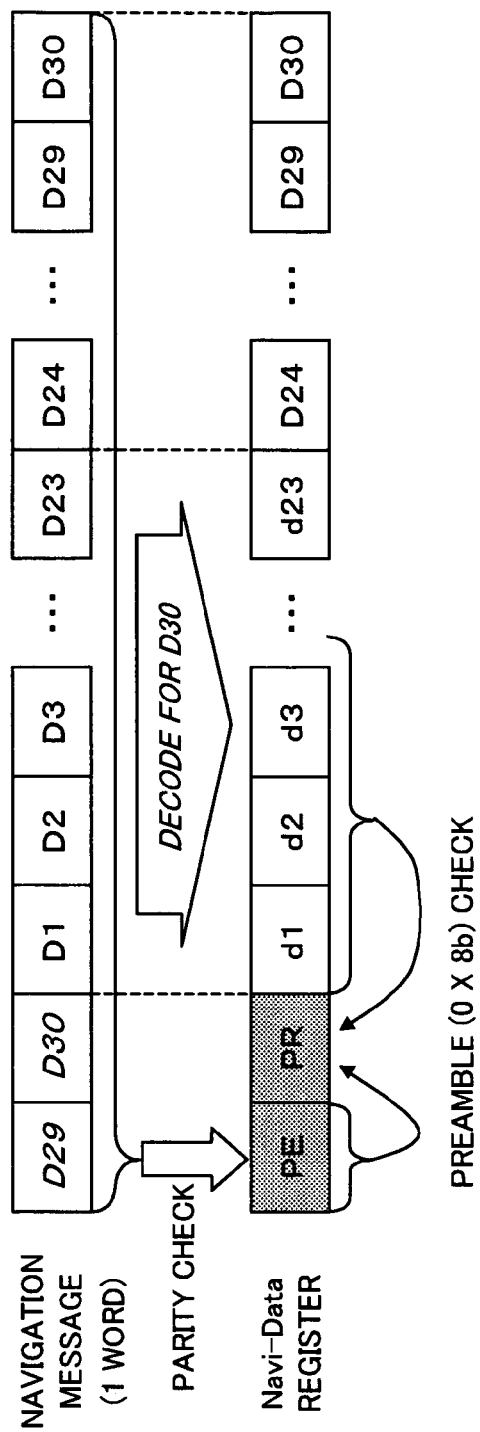

COMMUNICATION DEVICE

BACKGROUND OF THE INVENTION

1. Field of the Invention

The present invention relates to communication device mounting for example a global positioning system (GPS) in a mobile phone or other portable terminal.

2. Description of the Related Art

In a GPS measuring the position of a mobile body utilizing satellites (GPS satellites), the basic function of a GPS receiver is to receive signals from four or more GPS satellites, calculate the position of the receiver from the received signals, and inform it to the user.

The GPS receiver demodulates a signal from a GPS satellite to acquire orbital data of the GPS satellite and derives its own three-dimensional position from the orbit and time information of the GPS satellite and delay time of the received signal by simultaneous equations. The reason why four GPS satellites giving received signals are required is that there is error between the time inside the GPS receiver and the time of a satellite and that error must be eliminated.

In the case of a GPS receiver for consumer use, a positioning computation is carried out by receiving a spread-spectrum signal wave referred to as the "L1 band" or "C/A" ("coarse acquisition" or "clear and acquisition") code from a GPS satellite (Navstar).

The C/A code is a signal obtained by binary phase shift keying (BPSK) modulating a carrier wave (hereinafter referred to as a "carrier") having a frequency of 1575.42 MHz by a signal obtained by spreading data of 50 bps by a code of a pseudorandom noise (PN) sequence having a transmission signal rate (chip rate) of 1.023 MHz and a code length of 1023, for example, the Gold code. In this case, since the code length is 1023, the C/A code is formed as a code comprised of the code of the PN sequence repeated using 1023 chips as one cycle (one cycle=1 millisecond (msec)) as shown in FIG. 1A.

The code of the PN sequence of this C/A code is different for every GPS satellite, but is configured so that which satellite uses which code of the PN sequence can be detected by a GPS receiver in advance. Further, the navigation message mentioned above enables the GPS receiver to learn from which GPS satellites signals can be received at that position and that point of time. Accordingly, in the case of for example three-dimensional positioning, the GPS receiver receives the waves from four or more GPS satellites which can be acquired at that position and that point of time, despreads the spectrum, and performs the positioning computation to find its own position.

Then, as shown in FIG. 1B, one bit of the satellite signal data is transmitted as 20 cycles' worth of the code of the PN sequence, that is, 20 milliseconds. Namely, the data transmission rate is 50 bps. 1023 chips of one cycle's worth of the code of the PN sequence are inverted between a time when the bit is "1" and a time when the bit is "0".

As shown in FIG. 1C, in a GPS, one word is formed by 30 bits (600 milliseconds). Further, as shown in FIG. 1D, one sub-frame (6 seconds) is formed by 10 words. As shown in FIG. 1E, the word at the header of one sub-frame has a preamble always regarded as a bit pattern even when data is updated inserted into it. The data is transmitted after this preamble.

Further, one frame (30 seconds) is formed by five sub-frames. The navigation message is transmitted in data units of this one frame. First, three sub-frames in this one frame of data form information inherent in the satellite referred to as "ephemeris information". This information includes parameters for finding the orbit of the satellite and a transmission time of a signal from the satellite.

All GPS satellites are provided with atomic clocks and use common time information. The transmission time of a signal from a GPS satellite is a one second unit of the atomic clock. Further, the code of the PN sequence of the GPS satellite is generated as a code in synchronization with the atomic clock.

The orbit information of the ephemeris information is updated every several hours, but becomes the same information until that update. By holding the orbit information of the ephemeris information in the memory of this GPS receiver, however, the same information can be precisely used for a few hours. Note that the transmission time of the signal from a GPS satellite is updated every one second.

The navigation message of the remaining two sub-frames of one frame of the data is information commonly transmitted from all satellites and referred to as "almanac information". 25 frames' worth of this almanac information become necessary in order to acquire all information. It is comprised of rough position information of each GPS satellite, information indicating which GPS satellites can be used, etc. This almanac information is updated every several months, but becomes the same information until that update. By holding this almanac information in the memory of the GPS receiver, the same information can be precisely used for several months.

In order to receive a GPS satellite signal and obtain the above data, first the carrier is removed, then a code of the PN sequence (hereinafter the code of the PN sequence will be referred to as the "PN code") the same as the C/A code used in the GPS satellite to be received prepared in the GPS receiver is used to acquire the signal from the GPS satellite and despread the spectrum. When phase synchronization with the C/A code can be established and the spectrum is despread, the bit is detected, and it becomes possible to acquire a navigation message including the time information from the signal from the GPS satellite.

The signal from the GPS satellite is acquired by phase retrieval of the C/A code. In this phase retrieval, the correlation between the PN code of the GPS receiver and the PN code of the received signal from the GPS satellite is detected. For example, when the correlation value of the result of the correlation detection is larger than the value set in advance, it is judged that the two are synchronized. When it is judged that synchronization has not been established, any synchronization technique is used to control the phase of the PN code of the GPS receiver to synchronize it with the PN code of the received signal.

As mentioned above, a GPS satellite signal is a signal obtained by BPSK modulating a carrier by a signal obtained by spreading data by a spread code. Accordingly, in order for a GPS receiver to receive a GPS satellite signal, it is necessary to establish synchronization of not only the spread code, but also the carrier and the data, but the spread code and the carrier cannot be independently synchronized.

A GPS receiver generally converts the carrier frequency in the received signal to an intermediate frequency in several MHz and performs the synchronization detection processing mentioned above by that intermediate frequency signal. The carrier in the intermediate frequency signal includes a frequency error mainly due to a Doppler shift in accordance with the velocity of the GPS satellite and a frequency error of a local oscillator generated inside the GPS receiver when converting the received signal to an intermediate frequency signal.

Accordingly, due to these frequency error factors, the carrier frequency in the intermediate frequency signal is unknown, so a frequency search becomes necessary. Further, a synchronization point (synchronization phase) of the spread code in one cycle depends upon the positional relationship between the GPS receiver and the GPS satellite, so is unknown. Therefore, as mentioned above, some sort of synchronization technique becomes necessary.

The GPS receiver uses a synchronization technique employing a frequency search for the carrier and a sliding correlator+delay locked loop (DLL)+Costas loop. This will be explained below.

The clock for driving the generator of the PN code of the GPS receiver is generally one obtained by dividing the frequency of the oscillation signal of a reference frequency oscillator provided in the GPS receiver. As this reference frequency oscillator, use is made of a high precision quartz oscillator. From the output of this reference frequency oscillator, a local oscillation signal used for converting the received signal from a GPS satellite to an intermediate frequency signal is generated.

FIG. 2 is a view for explaining this frequency search. As shown in FIG. 2, when the frequency of the clock signal for driving the generator of the PN code of the GPS receiver is a certain frequency f1, phase retrieval of the PN code is performed, that is, the phase of the PN code is sequentially shifted by one chip, the correlation between the GPS received signal and the PN code at the time of each chip phase is detected, and the peak value of the correlation is detected, whereby it is possible to detect the phase at which synchronization can be established.

When the frequency of the clock signal is f1 and there is no synchronized phase in all of the 1023 chips' worth of the phase retrieval, for example the frequency division ratio with respect to the reference frequency oscillator is changed, the frequency of the drive clock signal is changed to f2, and 1023 chips' worth of phase retrieval is carried out in the same way as above. This is repeated by stepwise changing the frequency of the drive clock signal as shown in FIG. 2. The above operation constitutes the frequency search.

When this frequency search detects the frequency of the drive clock signal regarded to be able to be synchronized, the final phase synchronization of the PN code is carried out at that clock frequency. Due to this, even if there is deviation in the oscillation frequency of the quartz frequency oscillator, it becomes possible to acquire a satellite signal.

However, if the above-mentioned technique is used as the synchronization method, this would be unsuitable for fast synchronization in principle. In an actual receiver, in order to compensate for this, it would be necessary to search for the synchronization point in parallel by forming multiple channels. Further, as described above, if a long time is required for the synchronization of the spread code and carrier, the response of the GPS receiver would become slow. This would be inconvenient in usage. Therefore, for the phase synchronization of the spread code, a technique of performing the code synchronization by a digital matched filter using fast Fourier transform (FFT) processing without using the technique of sliding correlation as mentioned above is realized by improvement of the capability of the hardware such as the digital signal processor (DSP).

Summarizing the problems to be solved by the invention, in recent years, products combining mobile phones or other networked portable terminals and GPS receivers and services for the same have been put into practical use. As cheaper networks are built in the future, the network hardware and GPS systems will become even more integrated, so it is predicted that network services utilizing positioning will increase.

The reference frequency oscillator applied to a GPS system basically has a fixed oscillation frequency, but the reference frequency oscillator used in a mobile phone etc. is configured so as to change in frequency according to a change in the base station or other conditions. Accordingly, if simply configuring a wireless communication device combining a network device and GPS system, it would be necessary to mount two types of reference frequency oscillators. However, this would result in the size of the module becoming larger and would also lead to a cost increase. For such a reason, when configuring a wireless communication device combining a network device and GPS system, it is desirable to make joint use of one reference frequency oscillator, that is, a reference frequency oscillator having a variable frequency as used in mobile phones etc. If simply making joint use of such a variable frequency reference frequency oscillator, however, the following disadvantages would arise.

As explained above, the transmission signal referred to as the "L1 band" or "C/A code" of a GPS satellite is a signal obtained by BPSK modulating a carrier of 1575.42 MHz by a signal obtained by directly spreading data of 50 bps by the Gold code having a code length of 1023 and a chip rate of 1.023 MHz. Accordingly, in order to receive a signal from a satellite by a GPS receiver, as mentioned above, it is necessary to establish synchronization between the spread code and the carrier and data, but the synchronization of the spread code and the carrier cannot be independently carried out. The GPS receiver converts the carrier frequency to within several MHz and processes it by the intermediate frequency (IF). However, the carrier at the IF includes an error of the local oscillation frequency mainly generated inside the receiver at the time of the Doppler shift due to the velocity of the satellite and the conversion to the IF, therefore the carrier frequency at the IF is unknown. Further, the phase of the spread code depends upon the positional relationship between the GPS receiver and the satellite, so is unknown. Accordingly, when using a reference frequency oscillator changing in frequency according to the conditions, if the frequency changes, the frequency of the IF carrier also changes. If the frequency of the IF carrier changes, the synchronization between the received signal and the spread code can no longer be held. As a result, it becomes impossible to continuously track the satellite.

SUMMARY OF THE INVENTION

An object of the present invention is to provide a communication device not only able to prevent an increase of the module size and cost, but also able to establish synchronization of the frequency even if the oscillation frequency of an oscillator changes and able to continuously maintain tracking of the carrier.

To attain the above object, according to a first aspect of the present invention, there is provided a communication device for demodulating a received signal by a spread code, comprising an oscillator for outputting a reference signal having an oscillation frequency changing by exactly a predetermined frequency in accordance with the communication conditions; a tracking unit having a plurality of loop units for performing tracking processing for the received signal based on the reference signal of the oscillator; and a control unit for monitoring whether or not the oscillation frequency of the oscillator changes and setting the synchronization frequency of each loop unit of the tracking unit in accordance with existence of the change of the frequency.

Preferably, the tracking unit extracts predetermined data included in the received signal and outputs it to the control unit, and the control unit performs predetermined computation processing with respect to the extracted data and stops the change of the oscillation frequency of the oscillator during the computation processing.

A communication device according to a second aspect of the present invention has a first communication unit including an oscillator for outputting a reference signal having an oscillation frequency changing by exactly a predetermined frequency in accordance with communication conditions and outputting a frequency change signal when the oscillation frequency of the oscillator is to be changed and a second communication unit for demodulating a received signal by a spread code, wherein the second communication unit includes a tracking unit having a plurality of loop units for performing tracking processing for the received signal based on the reference signal of the oscillator of the first communication unit and a control unit for monitoring whether or not the oscillation frequency of the oscillator changes according to an input state of the frequency change signal by the first communication unit and setting the synchronization frequency of each loop unit of the tracking unit in accordance with existence of a change of the frequency.

Preferably, the tracking unit extracts predetermined data included in the received signal and outputs it to the control unit, and the control unit performs predetermined computation processing with respect to the extracted data and outputs a signal for instructing a stop of the change of the oscillation frequency of the oscillator during the computation processing to the first communication unit.

Further, preferably, when there is no information of a frequency change, the control unit makes the tracking unit operate divided into loop units for performing tracking processing at the currently synchronized frequency and loop units for performing tracking processing at the frequency obtained by adding the change of the frequency to the currently synchronized frequency.

Preferably, when there is information of a frequency change, the control unit makes the tracking unit operate divided into a plurality of loop units for performing the tracking processing at a plurality of frequencies, excluding the currently synchronized frequency, obtained by adding the change of the frequency to the currently synchronized frequency.

According to the present invention, for example, the first communication unit engages in speech with a close base station or controls transfer of predetermined data in synchronization with the reference signal of the oscillator. Further, when the base station of the other party in the communication changes, the first communication unit changes the oscillation frequency of the oscillator according to established protocols by generating a frequency change signal for reporting that the base station has changed and the frequency is to be changed and outputting it to the control unit of the second communication unit. The control unit of the second communication unit receives the frequency change signal from the first communication unit and performs control so as to continue to maintain the tracking of the carrier in the tracking processing based on the information of the change of the reference frequency, for example, the frequency change $\Delta f$ or the DIR or number of bits or other parameters. For example, if the frequency of the reference signal from the first communication unit does not change, the control unit does not receive a frequency change signal, and there is no frequency change information, the tracking unit is controlled by the control unit so as to operate divided into loop units for the currently synchronization frequency f and loop units for the frequency $\Delta fs$ of the ± change from the currently synchronized frequency f. Due to this, if the frequency changes, it becomes possible to synchronize the loop units in either the ± frequency band with respect to f and it becomes possible to continuously track the satellite.

Further, in the tracking unit, when the frequency of the reference signal from the first communication unit changes, the control unit receives the frequency change signal, and there is the frequency change information, the tracking unit is controlled by the control unit so as to operate divided into loop units for the frequency $\Delta fs$ of the ± change with respect to the currently synchronized frequency f (scalar multiple of change) except the currently synchronized frequency f band. Due to this, if the frequency changes, it is possible to synchronize the loop units at either the ± frequency band with respect to f, it is possible to continuously track a satellite, and it is possible to reduce the number of channels.

The control unit performs processing for computation for positioning, position retrieval, etc. based on the predetermined data extracted by the above tracking processing, for example, range data, Doppler shift, navigation message, and time. Further, the control unit outputs a frequency change stop signal to the first communication unit so as to prevent the frequency of the carrier changing when the frequency of the reference signal changes and synchronization of the received signal and the spread code no longer being able to be held during the positioning computation. Due to this, even if the base station of the other party in communication changes and it becomes necessary to change the oscillation frequency of the oscillator according to the established protocols, the first communication unit is controlled not to change the frequency until the positioning computation is finished.

BRIEF DESCRIPTION OF THE DRAWINGS

These and other objects and features of the present invention will become clearer from the following description of the preferred embodiments given with reference to the attached drawings, wherein:

FIGS. 1A to 1E are views of the configuration of a signal from a GPS satellite;

FIG. 8 is a view for explaining the frequency search of a satellite of the DSP of the acquisition unit;

FIGS. 9A to 9D are views for explaining processing for removal of a navigation message of the DSP of the acquisition unit;

FIGS. 17A to 17C are views for explaining a phase control operation in a delay locked loop of the tracking unit according to the present embodiment;

FIGS. 22A to 22C are views for briefly explaining retrieval of a phase of a PN of the control unit according to the present embodiment; and FIGS. 23A and 23B are views for explaining a decoding function of a navigation message (one word) of the control unit according to the present embodiment.

DESCRIPTION OF THE PREFERRED
EMBODIMENTS

Preferred embodiments of the present invention will be described in detail below while referring to the attached figures.

Figure 2:
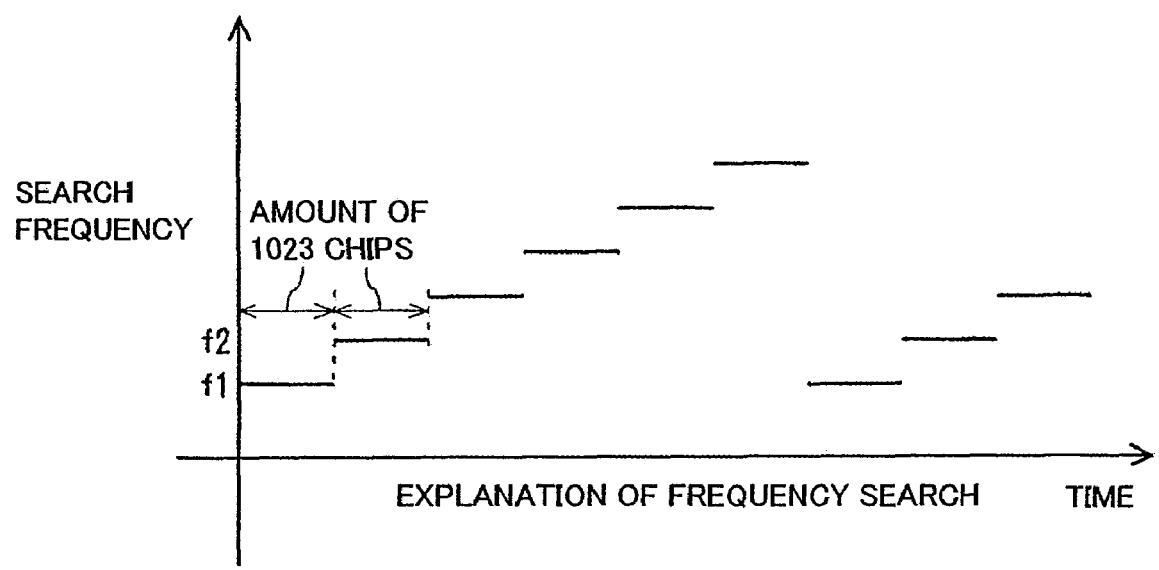
FIG. 2 is a view of an example of synchronization processing of a carrier and a spread code.
Figure 3:
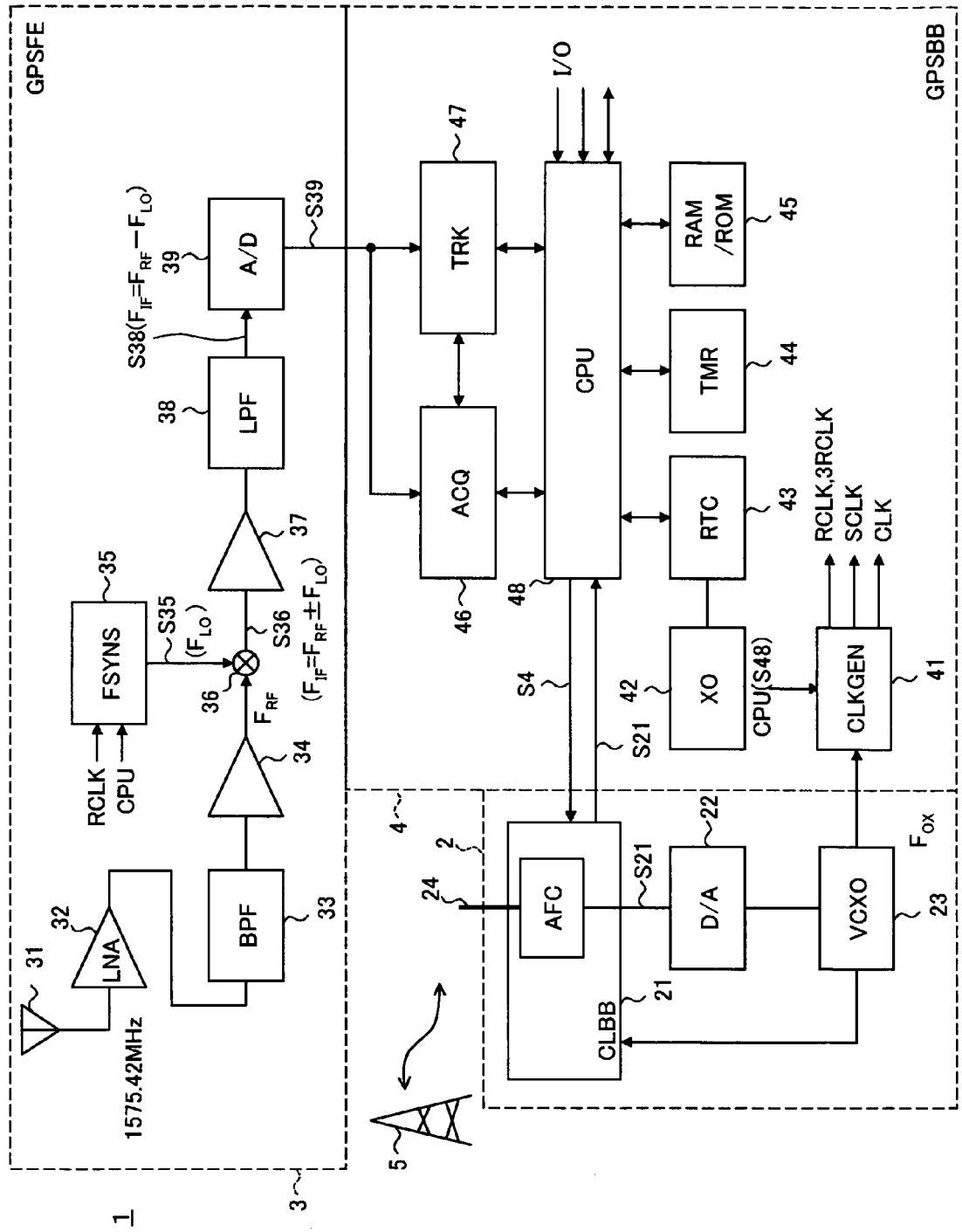
FIG. 3 is a view of the configuration of an embodiment of a communication device according to the present invention.

FIG. 3 is a view of the configuration of an embodiment of a communication device according to the present invention. This communication device is configured as a communication device combining a mobile phone as a networked portable terminal and a GPS receiver and making common use of the reference frequency oscillator of the mobile set.

The communication device 1 has, as shown in FIG. 3, a mobile phone unit 2, a GPS front end unit (GPSFE) 3, and a GPS baseband unit (GPSBB) 4 as main components. Note that a first communication unit is configured by the mobile phone unit 2, while a second communication unit is configured by the GPS front end unit 3 and the GPS baseband unit 4.

The mobile phone unit 2 has mobile phone functions which can be applied to a mobile communication system, for example, a cellular system. The mobile phone unit 2 has, as shown in FIG. 3, a cellular baseband unit (CLBB) 21, a digital/analog (D/A) converter 22, a reference frequency oscillator (VCXO) 23, and a transmission and reception antenna 24.

The baseband unit 21 engages in speech with a close base station 5 or controls transfer of predetermined data through the transmission and reception antenna 24 in synchronization with the reference signal from the reference frequency oscillator 23. Further, the baseband unit 21 changes the oscillation frequency of the reference frequency oscillator 23 according to established protocol if the base station 5 of the other party in communication changes by generating a frequency change signal S21 for reporting that the base station has changed and the frequency is to be changed and outputting it to the D/A converter 22 and the control unit (CPU) of the GPS baseband unit 4. When the baseband unit 21 outputs the frequency change signal S21 to the CPU of the GPS baseband unit 4, it uses a serial, IO, or interrupt function to output information of the reference frequency changing, for example, the frequency change Δf or the DIR or number of bits or other parameters as the frequency change signal S21. Further, when receiving a frequency change stop signal S4 indicating that a positioning computation is in progress from the CPU of the GPS baseband unit 4, the baseband unit 21 performs control so as to stop the output of the frequency change signal S21 to the D/A converter 22 and the CPU of the GPS baseband unit 4 and prevent the reference frequency oscillator 23 from changing the frequency until the state of the positioning computation being in progress is lifted by the signal S4 even if the base station 5 of the other party in communication changes and it becomes necessary to change the oscillation frequency of the reference frequency oscillator 23 according to the established protocols.

The D/A converter 22 converts a digital frequency change signal S21 from the baseband unit 21 to an analog signal and outputs it to the reference frequency oscillator 23.

The reference frequency oscillator 23 uses for example 13 MHz±0.1 ppm as the reference oscillation frequency f and supplies a reference signal Fox to the baseband unit 21 and the clock generation unit 41 of the GPS baseband unit 4. The reference frequency oscillator 23 changes the oscillation frequency by exactly Δf (for example 0.7 Hz) according to the frequency change instruction of the analog frequency change signal S21 from the D/A converter 22 and supplies a reference signal Fox having a frequency f+Δf after the change to the baseband unit 21 and the clock generation unit 41 of the GPS baseband unit 4.

The GPS front end unit 3 receives a radio GPS signal RF having a high frequency 1575.42 MHz from the GPS satellite, amplifies the weak GPS signal, converts it to the intermediate frequency (IF) signal of 1.023 MHz, and further converts the analog IF signal to a digital IF signal and supplies the same to the GPS baseband unit 4.

The GPS front end unit 3 has, as shown in FIG. 3, an antenna 31, a low noise amplifier (LNA) 32, a band pass filter (BPF) 33 made of a SAW filter, an amplifier 34, a frequency synthesizer (FSYNS) 35, a mixer 36, an amplifier 37, a low pass filter (LPF) 38, and a analog/digital circuit (A/D) 39.

The frequency synthesizer 35 includes a PLL circuit etc., generates an oscillation signal S35 of for example 1574.393 MHz of 85.5 times the 18.414 MHz of the frequency FL0 of the reference clock CLK in accordance with the reference clock RCLK of 18.414 MHz generated at the GPS baseband unit 4 and the control signal of the CPU, and supplies the same to the mixer 36.

The mixer 36 mixes the received RF signal of the frequency FRF (1575.42 MHz) and the frequency FL0 (1574.397 MHz) and converts the result to an IF signal S36 of a frequency FIF (FRF±FL0=1.023 MHz, 3139.817 MHz).

The LPF 38 outputs an IF signal S38 obtained by passing only the low frequency component of the IF signal S36 obtained at the mixer 36 via the amplifier 37, that is, the frequency FIF (FRF−FL0=1.023 MHz).

Note that, when the error of the reference clock RCLK is ΔFRCLK (=about ±3 ppm), the frequency FL0 of the oscillation signal S35 of the frequency synthesizer 35 is given by the following equation:

$$FL0 = 121.10816 \times (13\ \text{MHz} + \Delta FRCLK)$$

Further, when the Doppler shift is ΔD, the frequency FIF of the IF signal S38 is given from the LPF 38 by the following equation:

$$FIF = 1.013962\ \text{MHz} + \Delta D + 121.10816 \times \Delta FRCLK$$

Note that the cycle T of the received C/A code does not change according to the conversion of frequency from the RF signal to the IF signal. Namely, this is irrelevant to the error ΔFRCLK of the reference clock RCLK. The fluctuation of the cycle T is for example about (1 ms+change due to Doppler shift).

The GPS front end unit 3 receives the radio RF signal of the format as shown in FIG. 1 from the GPS satellite having a frequency of 1575.42 MHz at the antenna 31. The received RF signal is amplified at the low noise amplifier 32, is stripped of any signal outside of the GPS signal band at the BPF 33 serving as the SAW filter, and is input to the mixer 36 via the amplifier 34. Then, the mixer 36 mixes it with the oscillation signal S35 by the frequency synthesizer 35, then passes the result through the amplifier 37 and the LPF 38 to extract the IF signal S38 having a frequency of 1.023 MHz. The IF signal S38 is converted to a digital signal at the binary-coded circuit 39 and output as a one-bit serial signal IF signal S39 to the GPS baseband unit 4.

The GPS baseband unit 4 receives the reference signal Fox of the frequency 13 MHz (or ±0.7 Hz) from the mobile phone unit 2, outputs a reference clock RCLK having a frequency of 13 MHz as it is or generates a clock obtained by multiplying or dividing the reference signal Fox, receives an IF signal S39 from the GPS front end unit 3 based on these clocks, performs acquisition for finding the synchronization point initially or when the system largely deviates from the synchronized state, controls the delay difference to be sufficiently smaller than one chip length of the spread code after the acquisition, performs tracking for establishing synchronization of the C/A code and carrier, and performs positioning computation, position retrieval, and other processing based on the range data, Doppler shift, navigation message, time, etc.

Further, the GPS baseband unit 4 receives the frequency change signal S21 from the mobile phone unit 2 and, based on the information of the reference frequency changing, for example, the frequency change Δf or the DIR or number of bits or other parameters, performs control so as to continuously hold the synchronization of the IF carrier in the tracking processing.

Further, when the frequency of the reference signal Fox frequently changes, the GPS baseband unit 4 finds it difficult to synchronize with the frequency of the RF signal from the GPS satellite found by the acquisition or find the frequency of the signal from the GPS satellite, therefore performs control to give the frequency change of the reference signal Fox to the carrier acquisition unit and the synchronization portion so as to synchronize with the frequency of the signal from the GPS satellite and reliably find the frequency of the signal from the GPS satellite. This control will be explained later.

Further, the GPS baseband unit 4 prevents the frequency of the IF carrier changing when the frequency of the reference clock RCLK changes during the positioning computation and the synchronization of received signal and the spread code no longer being able to be held by outputting the frequency change stop signal S4 to the baseband unit 21 of the mobile phone unit 2 and performing control so as to prevent a change of the frequency until the positioning computation is ended even if the base station 5 of the other party in communication changes and it becomes necessary to change the oscillation frequency of the reference frequency oscillator 23 according to the established protocols. In a cellular system, the oscillation frequency is changed in 2 seconds or more, therefore the positioning computation may be ended during that time.

The GPS baseband unit 4 has, as shown in FIG. 3, a clock generation unit (CLKGEN) 41, an oscillator (XO) 42, a real time clock unit (RTC) 43, a timer (TMR) 44, a memory unit (RAM/ROM) 45, an acquisition unit (ACQ) 46, a tracking unit (TRK) 47, and a control unit (CPU) 48.

The clock generation unit 41 includes a multiplier, frequency divider, etc. Under the control of a control signal S48 of a control unit 48, it receives the reference signal Fox using the 13 MHz ±0.1 ppm (or ±0.7 Hz) from the reference frequency oscillator 23 of the mobile phone unit 2 as the reference oscillation frequency f, generates the reference clock RCLK, and supplies the same to the frequency synthesizer 35 of the GPS front end unit 3. Further, the clock generation unit 41 generates the clock CLK obtained by multiplying or dividing the frequency 13 MHz ±0.1 ppm (or ±0.7 Hz) of the reference signal Fox and supplies the same to the frequency synthesizer 35 of the GPS front end unit 3, the timer 44, the acquisition unit 46, and the tracking unit 47. Further, the clock generation unit 41 generates a sampling clock SCLK based on the reference signal Fox and supplies the same to the acquisition unit 46. Further, the clock generation unit 41 generates operation clocks CLK etc. of the control unit 48, the timer 44, the memory unit 45, etc. based on the reference signal Fox.

The oscillator 42 generates a timer use clock CK having a frequency of 32.768 kHz and supplies the same to the real time clock unit 43. The real time clock unit 43 receives the clock CK from the oscillator 42 and supplies a real time clock to the control unit 48.

There are a plurality of channels for transferring signals concerning time with the timer 44 and the control unit 48, for example, counting a reference clock RCLK having a frequency of for example 13 MHz. The plurality of channels include for example a channel used for a usual interval timer, a channel for a count of several seconds or more or power management, and channels for other functions.

The memory unit 45 includes a RAM and ROM and is accessed by the control unit 48.

The acquisition unit 46 receives the IF signal from the GPS front end unit 3 under the control of the control unit 48, performs a search of the GPS signal over a wide range (acquisition of the C/A code), processing for correlation detection by an FFT operation, and processing for removal of the navigation message, and transfers the search result, the correlation detection result, and the C/A code phase, the carrier frequency, and correlation level to the control unit 48.

Figure 4:
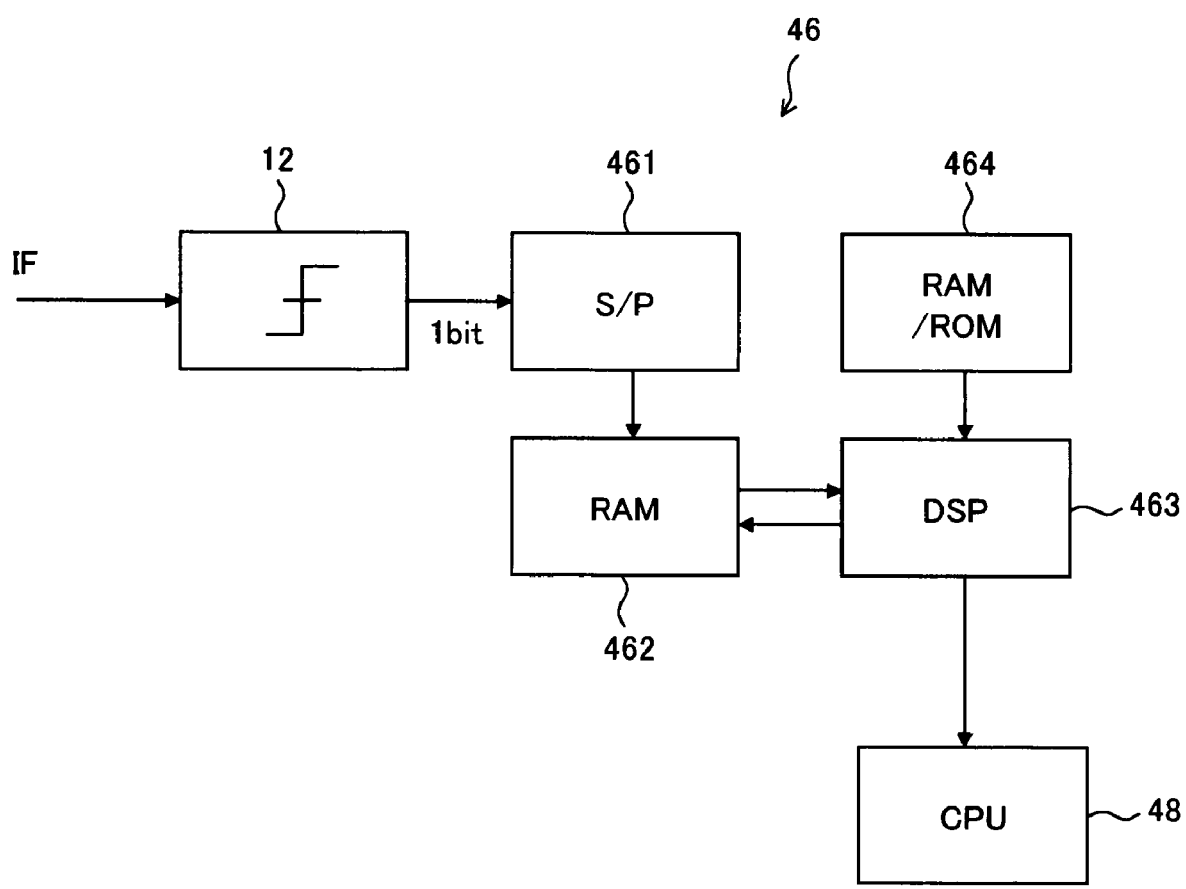
FIG. 4 is a block diagram of an example of the configuration of an acquisition unit according to the present embodiment.

FIG. 4 is a block diagram of an example of the configuration of the acquisition unit 46 according to the present embodiment.

The acquisition unit 46 has, as shown in FIG. 4, a serial/parallel converter (S/P) 461, a RAM 462, a DSP 463, and a memory (RAM/ROM) 464.

The serial/parallel converter 461 of the acquisition unit 46 starts the sampling of the IF signal (1 bit) based on the sampling clock SCLK by a command from the control unit 48, performs 4/18 thinning processing from the sample data of for example 13 MHz, converts the sampling signal to a parallel signal of 16 bits, and stores it in the RAM 462. Concretely, one dummy bit is inserted for every 1023 bits to obtain 4096 samples/ms.

The DSP 463 operates by a clock obtained by multiplying several fold (for example 3- or 4-fold) the frequency 13 MHz ±0.1 ppm (or ±0.7 Hz) of the reference signal from the clock generation unit 41 and performs a search of the GPS signal with respect to the data stored in the RAM 462. Further, the DSP 463 utilizes an FFT to detect the correlation with the C/A code so as to increase the speed. Further, the DSP 463 outputs an SV number, a C/A code phase np, a carrier frequency kc, and a correlation level to the control unit 48. Note that the resolution in the DSP 463 is for example 1/4 chip for the C/A code and (1/16) kHz for the carrier frequency.

Figure 5:
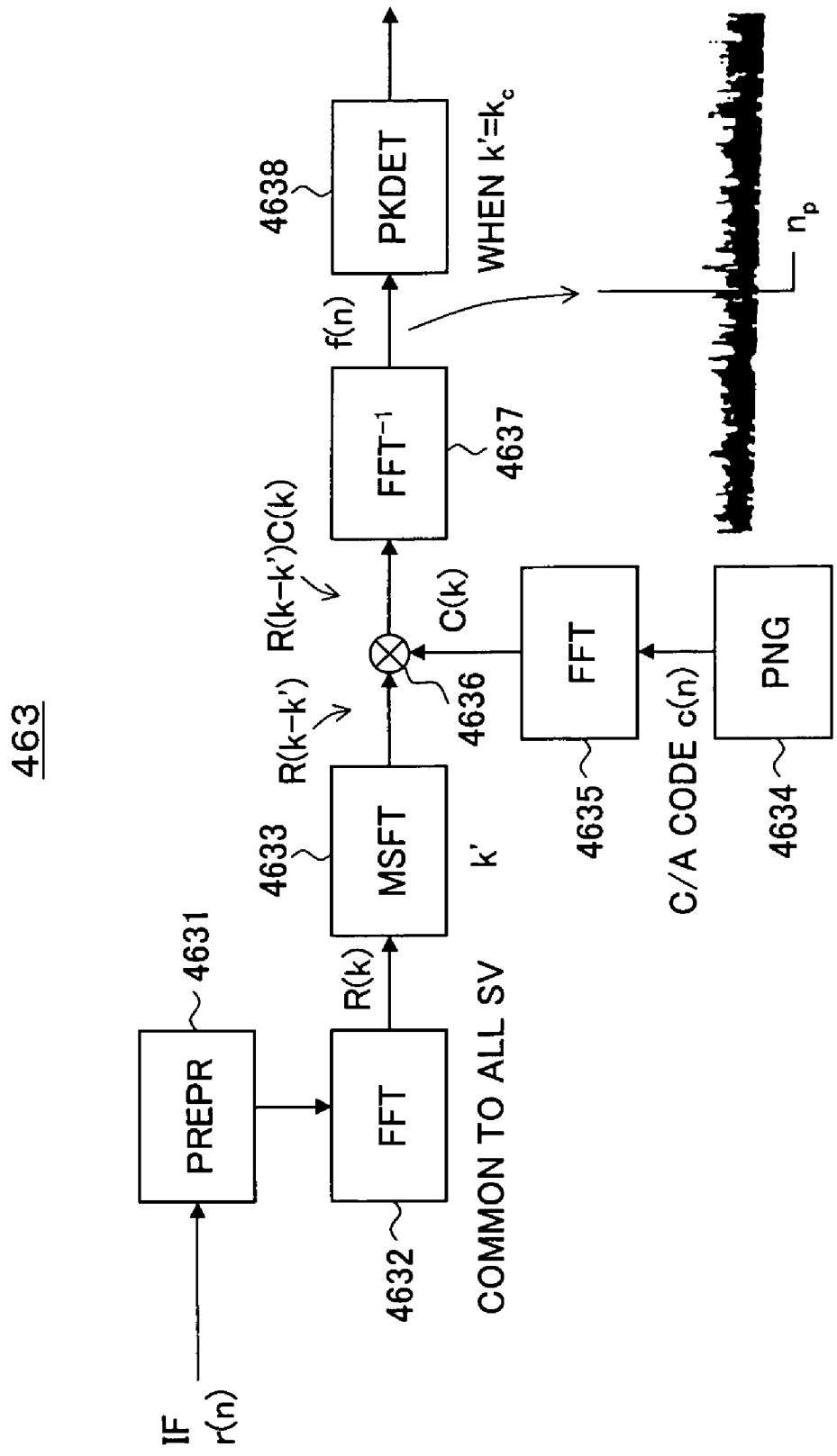
FIG. 5 is a block diagram of an example of the configuration of a DSP of the acquisition unit according to the above embodiment.

FIG. 5 is a block diagram of an example of the configuration of the DSP 463.

The DSP 463 has, as shown in FIG. 5, a pre-processing unit (PREPR) 4631, an FFT processing unit 4632, a memory shift unit (MSFT) 4633, a spread code generation unit (PNG) 4634, an FFT processing unit 4635, a multiplier 4636, an inverse FFT processing unit 4637, and a peak detection unit (PKDET) 4638.

The FFT processings of the FFT processing units 4632 and 4635 are basically carried out in for example units of 16 ms. The pre-processing unit 4631 performs the pre-processing for reducing the amount of 16 ms (65536 points) to 4096 points in order to perform the FFT processing of the IF signal.

The result of the FFT processing of the FFT processing unit 4632 is input to the memory shift unit 4633 as the signal R(k), subjected to shift processing by exactly k', and input as the signal R(k-k') to the multiplier 4636. Further, the C/A code c(n) generated at the spread code generation unit 4634 is subjected to the FFT processing at the FFT processing unit 4635. The result is input as a signal C(k) to the multiplier 4636. The multiplier 4636 multiplies the output signal R(k-k') of the memory shift unit 4633 and the output signal C(k) of the FFT processing unit 4635 and inputs the result R(k-k')·(Ck) to the inverse FFT processing unit 4637. Then, a signal f(n) obtained by the inverse FFT processing at the inverse FFT processing unit 4637 is input to the peak detection unit 4638, whereby the C/A code phase np, the carrier frequency kc, and the correlation level are detected and output to the control unit 48.

Figure 6:
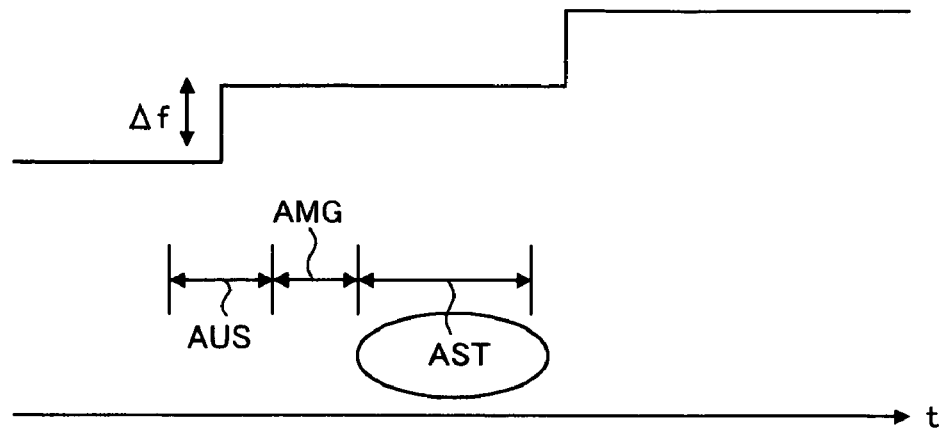
FIG. 6 is a view for explaining a frequency search of a satellite of the DSP of the acquisition unit.
Figure 7:
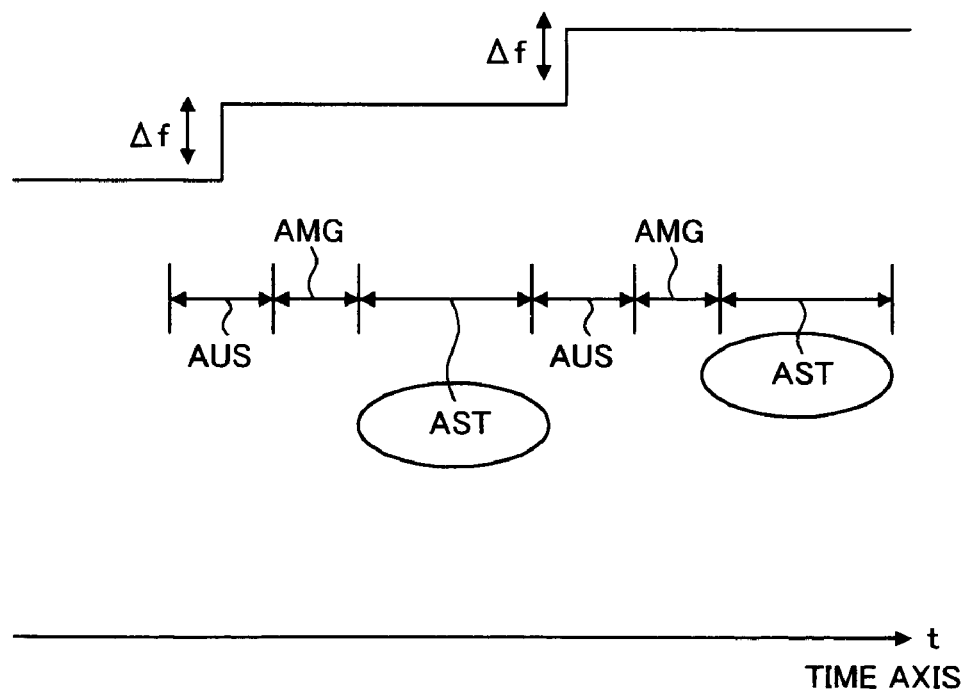
FIG. 7 is a view for explaining the frequency search of a satellite of the DSP of the acquisition unit.

The DSP 463 performs processings as shown in FIG. 6 to FIG. 8 under the control of the control unit 48 when the GPS signal is searched for, concretely when the frequency of the satellite is searched for.

The DSP 463 performs the frequency search by determining a clock stable area AST other than a margin area AMG set in advance in the area where the frequency of the reference signal Fox changes, that is, the clock unstable area AUS as shown in FIG. 6, by the frequency change information of the reference signal Fox from the control unit 48 (the change interval of the frequency is 2 seconds or more), and using the IF data in the RAM 462 at that frequency. Namely, by using the certain time-wise stable area for the frequency search of a satellite, it becomes possible to reliably find the frequency of the satellite. The positioning computation is also finished during this.

The DSP 463 receives the frequency change Δf of the reference signal Fox from the control unit 48 and, as shown in FIG. 5, performs the frequency search of the satellite at the frequency before the frequency change of the reference signal Fox after the frequency change of the reference signal Fox. Namely, by using two or more clock stable areas AST for the frequency search of the satellite, it becomes possible to perform the frequency search of the satellite over a long time.

The DSP 463 establishes the synchronization of the frequency of the satellite by transmitting the change f+Δf to the tracking unit 47 when the frequency of the reference signal Fox changes after the frequency search of the satellite.

Further, the DSP 463 performs processing for removal of the navigation message. In the processing for removal of this navigation message, if there is bit inversion of the navigation message in an interval of 16 ms, the correlation will not be constant. Therefore, for example, as shown in FIGS. 9A to 9D, the correlation value by the data sequence A having 16 cycles' length is designated as Add(++), the correlation value by the sequence B obtained by inverting the polarity of the latter half of A is designated as Add(+−), and |Add(++)|+|Add(+−)| is deemed constant. This is used as the correlation value. The bit transition position is estimated from Add(++) and Add(+−).

The tracking unit 47 has a delay locked loop (DLL) as the SS demodulator and a Costas loop as principal components. Under the control of the control unit 48, it receives the IF signal from the GPS front end unit 3, performs processings such as tracking of the C/A code by the DLL, tracking of the carrier by the Costas loop, and acquisition of the navigation message and the range data.

Figure 10:
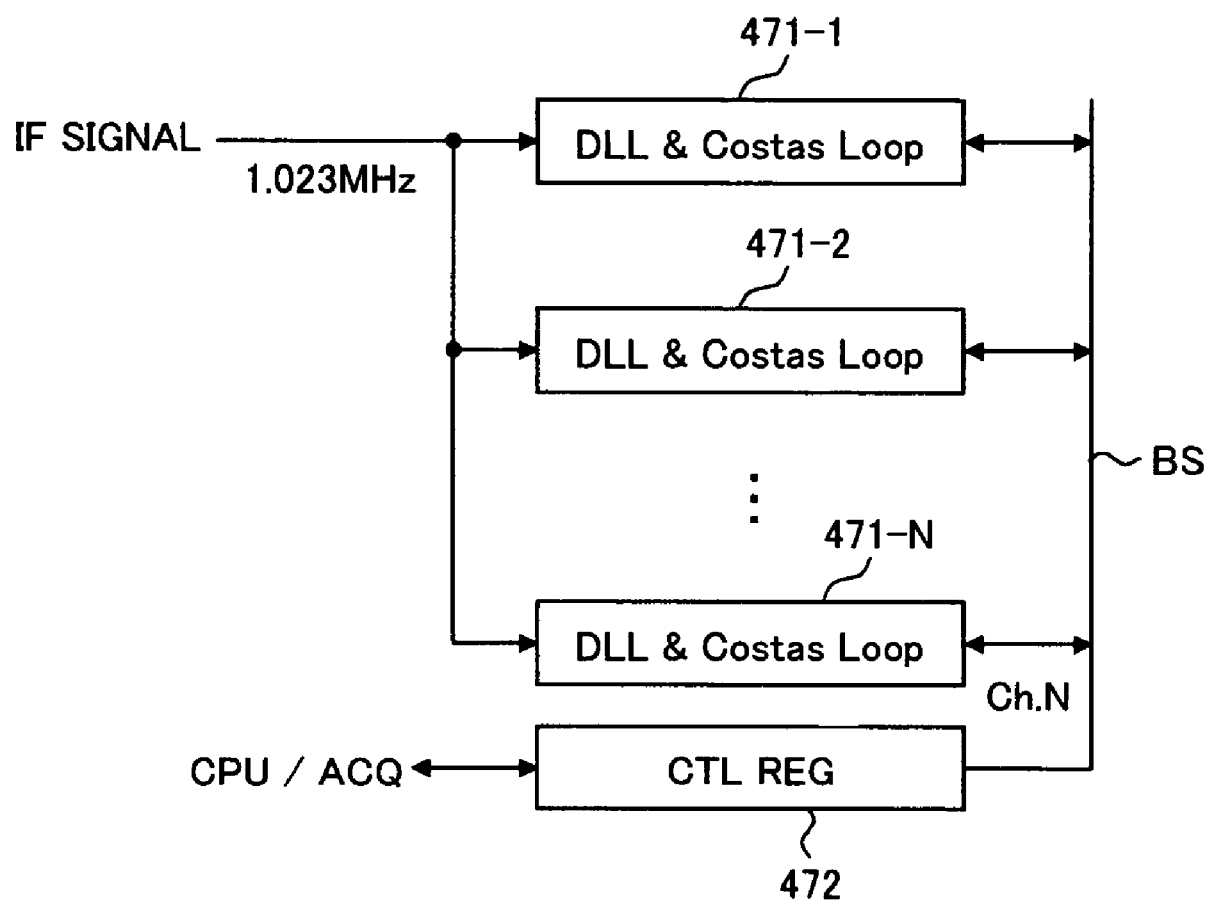
FIG. 10 is a block diagram showing main components of a tracking unit according to the present embodiment.

The tracking unit 47 has, for example as shown in FIG. 10, N (for example 12) number of DLL and Costas loop units (hereinafter, referred to as "loop units") 471-1 to 471-N connected in parallel with the input of the IF signal and a control register (CTLREG) 472 for transferring the control data with the control unit 48 and the tracking unit 47 and transferring the control data etc. with the DLL & Costas loop units 471-1 to 471-N via the bus BS.

Figure 11:
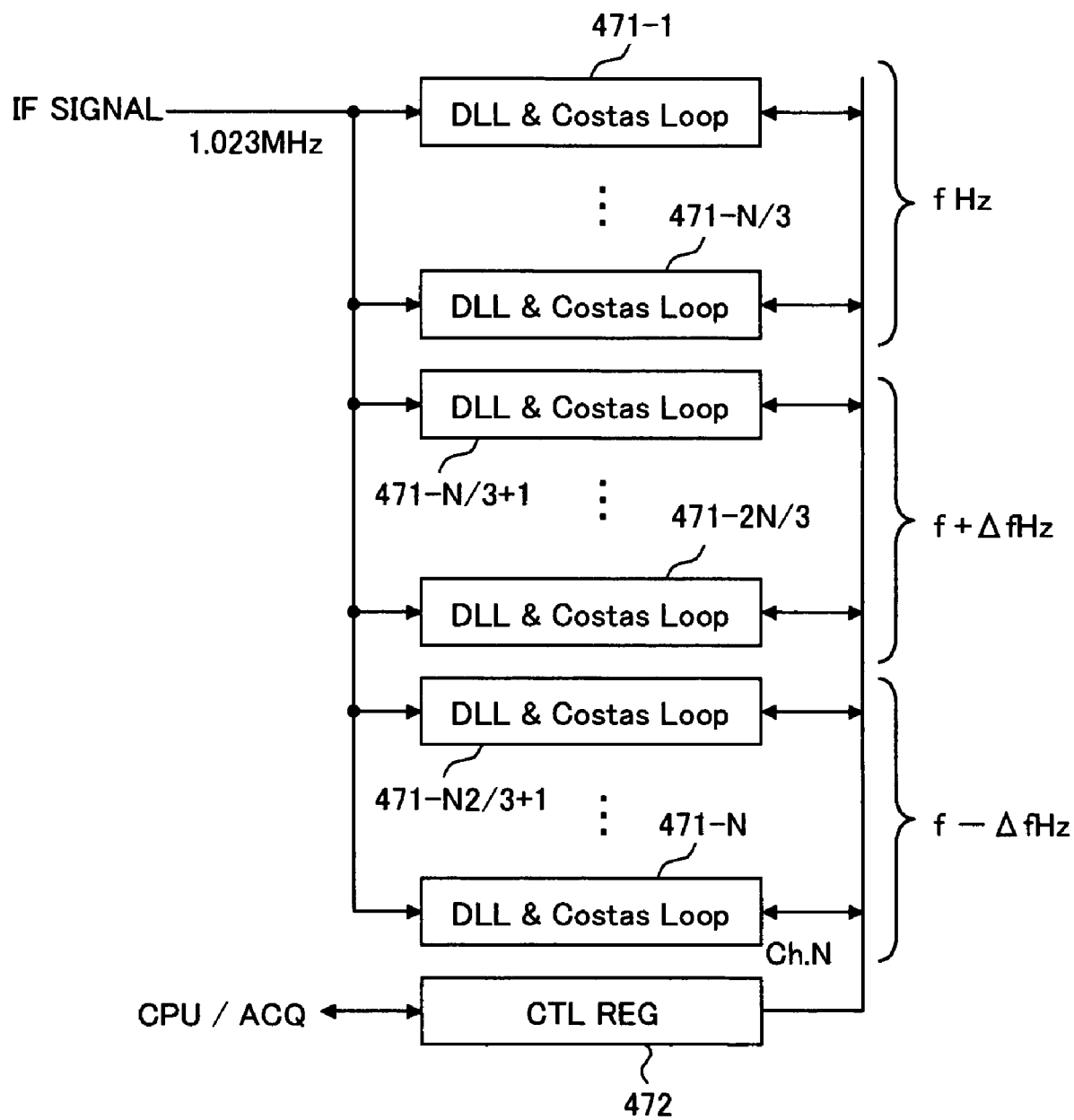
FIG. 11 is a view of an example of the configuration of the tracking unit when the frequency of a reference signal of a mobile phone unit does not change and a control unit does not receive a frequency change signal.

If the present frequency is f and a scalar multiple of the frequency change is Δfs, when the frequency of the reference signal Fox from the mobile phone unit 2 does not change and the frequency change signal S21 is not received, that is, when there is no frequency change information, the tracking unit 47 is set with control information in the control register 472 by the control unit 48 and operates divided into three groups of loop units as shown in FIG. 11. Concretely, the tracking unit 47 operates divided into the group of loop units (471-1 to 471-N/3) for the currently synchronized frequency f and the groups of loop units (471-N/3+1 to 471-2N/3, 471-2N/3+1 to 471-N) for the frequency Δfs of the ± change from the currently synchronized frequency f (scalar multiple of the change). Due to this, when the frequency changes, it is possible to synchronize the loop units in either the ± frequency band with respect to f, and it is possible to continuously track the satellite.

Figure 12:
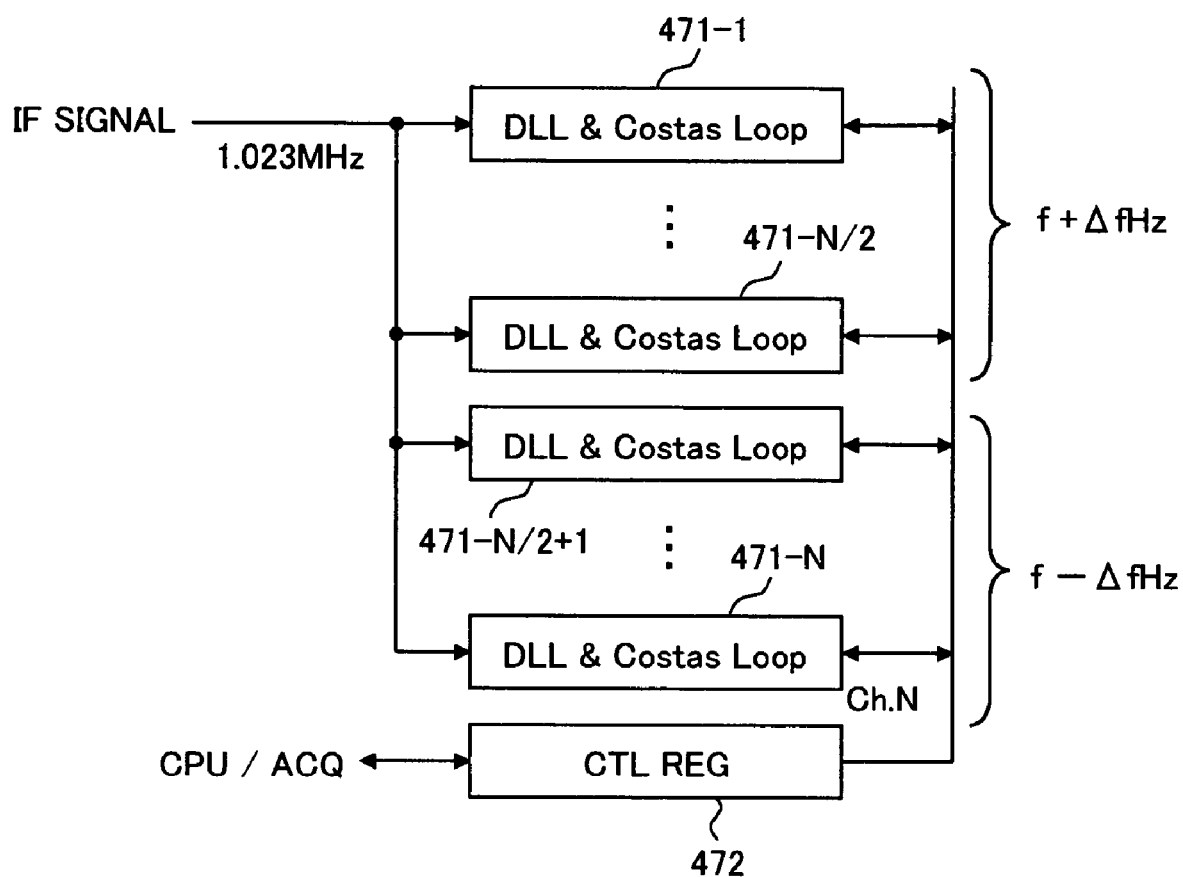
FIG. 12 is a view of an example of the configuration of the tracking unit when the frequency of the reference signal of the mobile phone unit changes and the control unit receives the frequency change signal.

If the present frequency is f and the scalar multiple of the frequency change is Δfs, when the frequency of the reference signal Fox from the mobile phone unit 2 changes and the frequency change signal S21 is received, that is, when there is frequency change information, the tracking unit 47 is set with control information in the control register 472 by the control unit 48 and operates divided into two groups of loop units as shown in FIG. 12. Concretely, the tracking unit 47 operates divided into the groups of loop units (471-1 to 471-N/2, 471-N/2+1 to 471-N) for the frequency Δfs of the ± change from the currently synchronized frequency f excluding the currently synchronized frequency f band (scalar multiple of change). Due to this, when the frequency changes, it is possible to synchronize the loop units in either the ± frequency band with respect to f, it is possible to continuously track the satellite, and it is possible to reduce the number of channels. When the frequency Δfs after the change (also the direction of ±) is known, it is not necessary to divide the loop units into a plurality of groups.

Figure 13:
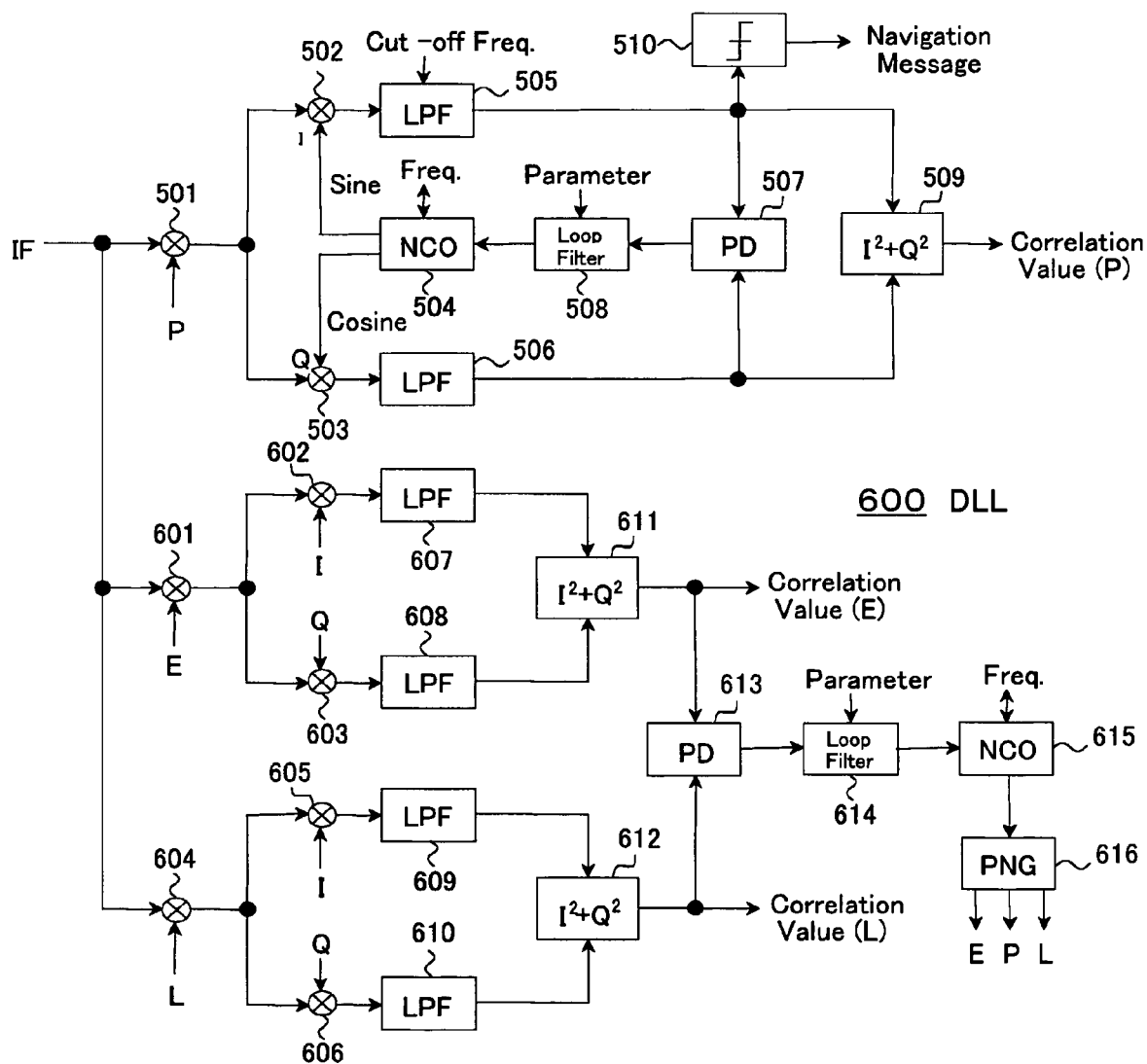
FIG. 13 is a circuit diagram of an example of the concrete configuration of a loop unit of the tracking unit according to the present embodiment.

FIG. 13 is a circuit diagram of an example of the concrete configuration of a loop unit 471 of the tracking unit 47 according to the present embodiment.

The loop unit 471, as shown in FIG. 13, comprises a Costas loop 500 for tracking of the carrier and the acquisition processing of the carrier frequency and the navigation message and a DLL 600 for tracking of the C/A code and the acquisition processing of an epoch signal and range data connected in parallel with respect to the input of the IF signal.

The Costas loop 500 has multipliers 501 to 503, a numerically controlled oscillator (NCO) 504, low pass filters (LPFs) 505 and 506, a phase detector (PD) 507, a loop filter 508, a correlation value operation unit 509, and a navigation message judgment unit 510.

In the Costas loop 500 and the DLL 600, the control unit 48 sets SV, the C/A code phase, and the NCO frequency from the search results of the DSP 463 of the acquisition unit 46.

Figure 14A:
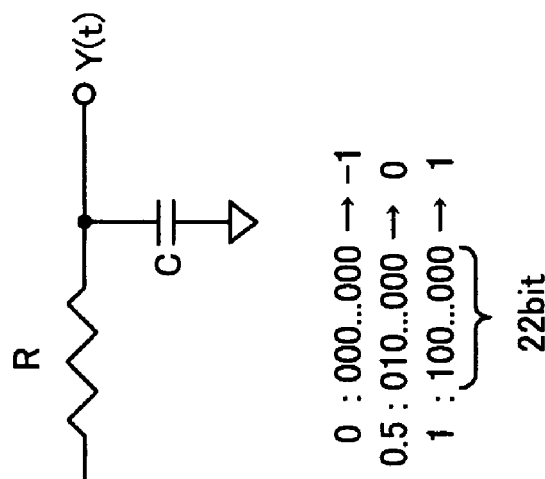
FIGS. 14A and 14B are circuit diagrams of an example of the configuration of a low pass filter of a Costas loop of the tracking unit according to the present embodiment.
Figure 14B:
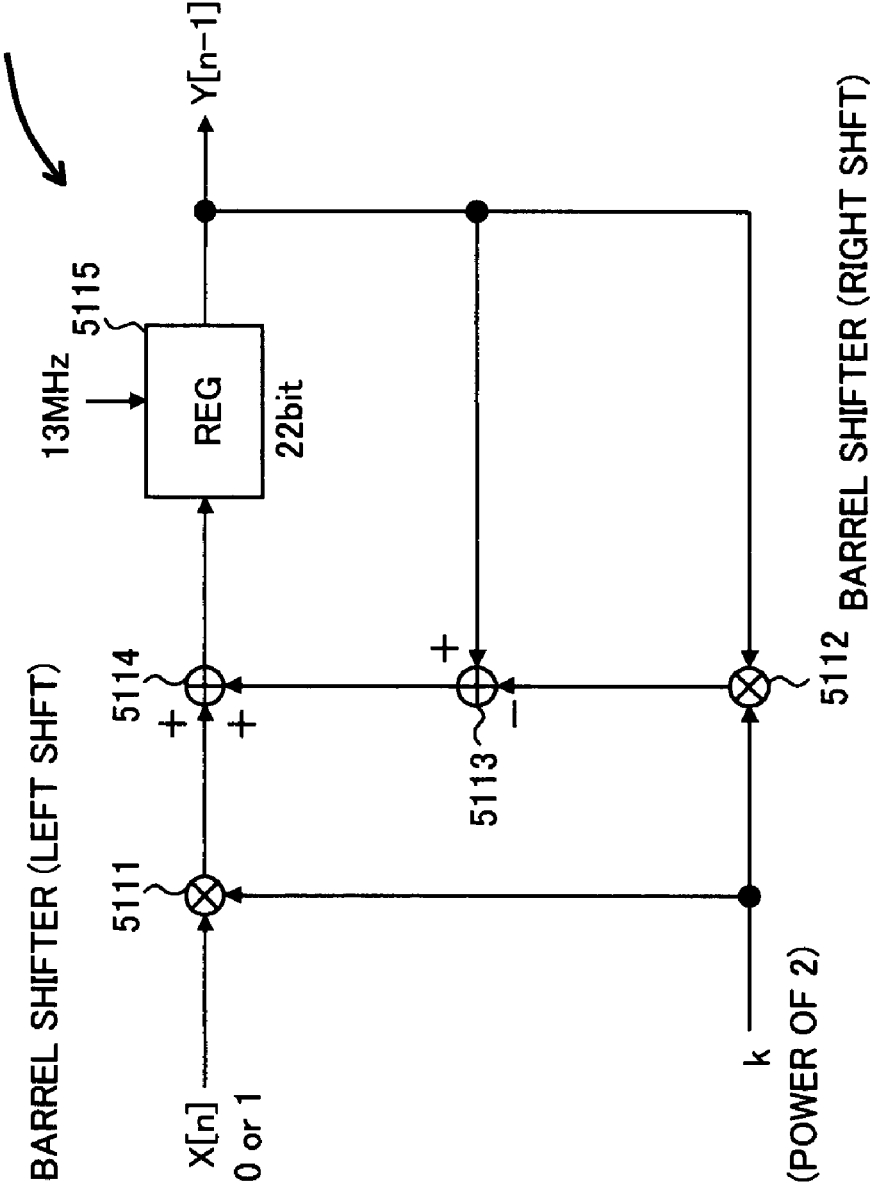

The LPFs 505 and 506 of the Costas loop 500 are constituted by IIR filters 511 as shown in FIG. 14B modeled for example on the RC filter shown in FIG. 14A and remove out-of-band noise of the BPSK signals.

Each IIR filter 511 is constituted by a left shift barrel shifter 5111, a right shift barrel shifter 5112, adders 5113 and 5114, and a register (REG) 5115 of predetermined bits (for example 22 bits). The output of the barrel shifter 5111 becomes kX[n]. The output of the barrel shifter 5112 becomes kY[n−1]. The output of the adder 5113 becomes (1−k)Y[n−1]. The output of the adder 5114 becomes Y[n]=(1−k)Y[n−1]+kX[n]. This Y[n] is a differential approximation of the RC filter.

Figure 15:
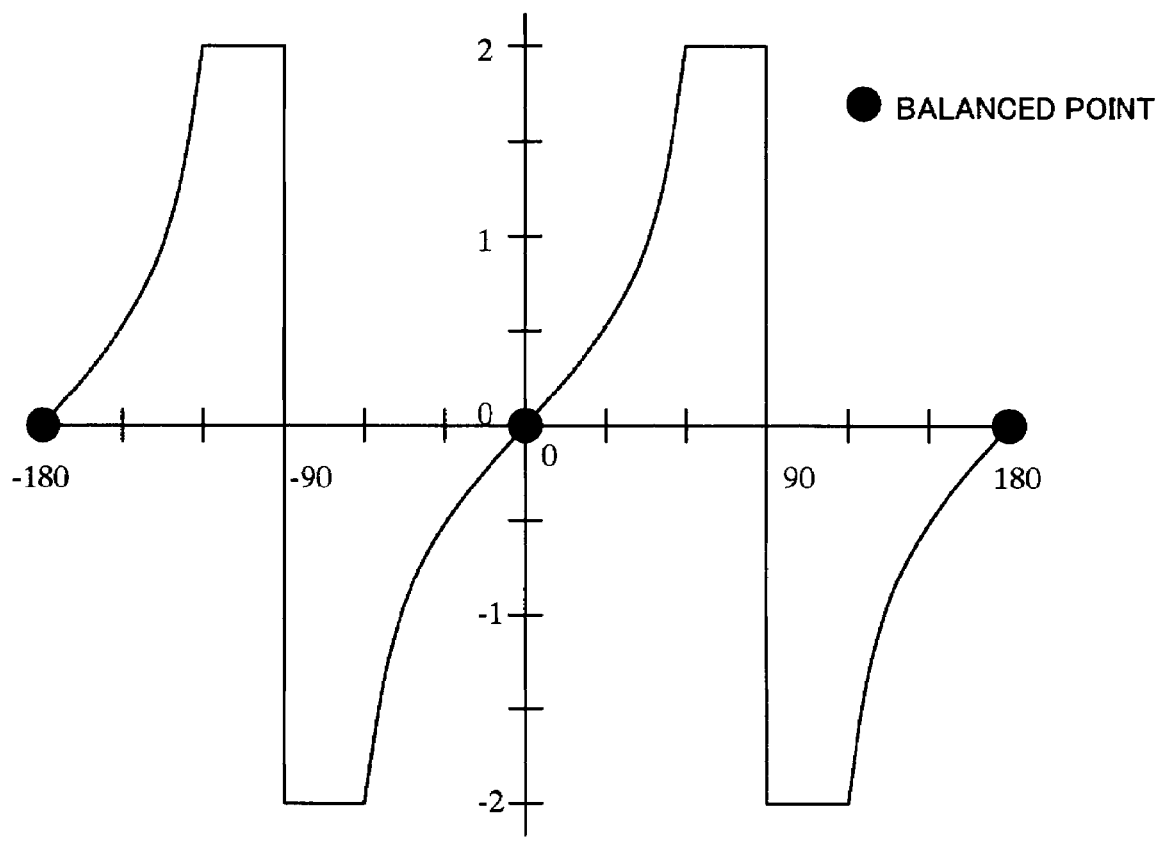
FIG. 15 is a view of characteristics of a phase detector of the Costas loop of the tracking unit according to the present embodiment.

The phase detector 507 of the Costas loop 500 detects the phase difference of the carrier and the NCO 504 at for example a 1 ms interval, controls the NCO 504 via the loop filter 508 by the detected phase difference to perform the acquisition (frequency pull-in), and thereby performs the tracking processing. FIG. 15 shows the characteristics of the phase detector 507 of the Costas loop 500. The phase detector 507 has a good phase comparison characteristic not depending upon the signal intensity.

The loop filter 508 of the Costas loop 500 integrates the output (phase difference) of the phase comparator 507 and controls the NCO 504.

Figure 16A:
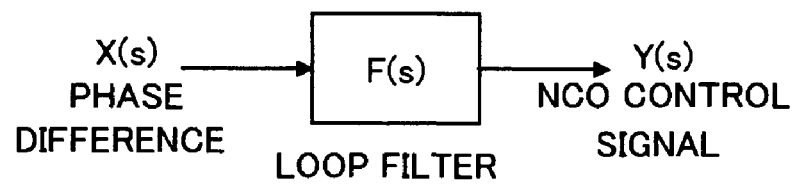
FIGS. 16A to 16C are views for explaining an example of the configuration of a loop filter of the Costas loop of the tracking unit according to the present embodiment.
Figure 16B:
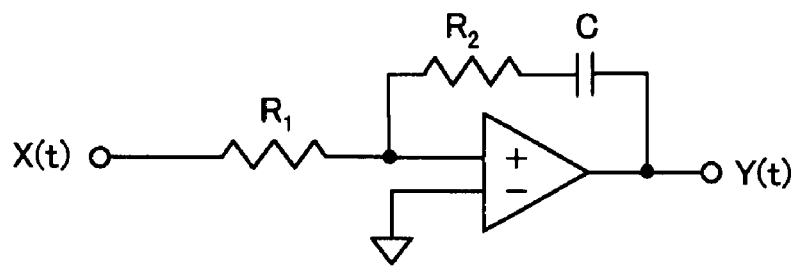

The loop filter 508 is constituted by for example a complete integration type active filter. For example, the transmission function F(s) of a complete integration type loop filter such as shown in FIGS. 16A and 16B can be represented as follows:

$$F(s)=(1+s\tau_2)/s\tau_1=\tau_2/\tau_1+1/s\tau_1$$

$$s\tau_1=R_1C, s\tau_2=R_2C$$

When differentially approximated, this can be represented as follows:

$$Y[n]=Y[n-1]+a\{X[n]-X[n-1]\}+bX[n]$$

$$a=96_2/\tau_1, b=T/\tau_1$$

where, T is the sampling cycle (1 ms).

Figure 16C:
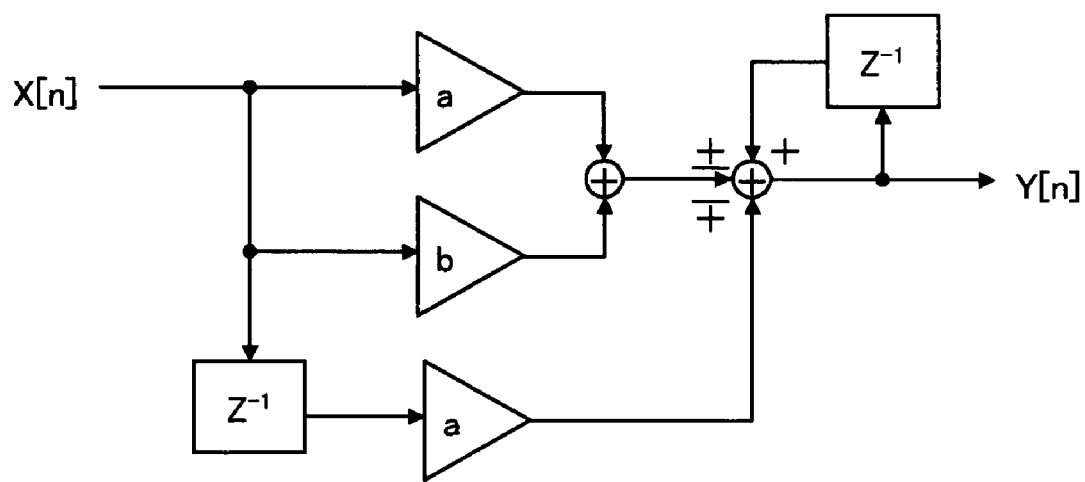

FIG. 16C shows a loop filter configured based on this equation. Here, "a" is the magnitude of the frequency difference, and "b" is the magnitude of the control with respect to the phase difference. A suitable "a" and "b" are set from the pull-in range and noise tolerance. Further, the search result (frequency) of the DSP 463 of the acquisition unit 46 is made the initial value Y[0].

In a Costas loop 500 having such a configuration, the IF signal is multiplied by a prompt signal P at the multiplier 501, and the carrier synchronization carried out. The output signal of the multiplier 501 is input to the multipliers 502 and 503. The multiplier 502 is supplied with an in-phase signal I having a predetermined frequency. The low frequency component of the multiplication result is extracted at the LPF 505 and supplied to the phase detector 507, the correlation value operation unit 509, and the navigation message judgment unit 510. Further, the multiplier 503 is supplied with a quadrature signal Q having a predetermined frequency. The low frequency component of the multiplication result is extracted at the LPF 506 and supplied to the phase detector 507 and the correlation value operation unit 509. Then, the detection result of the phase detector 507 is fed back to the NCO 504 through the loop filter 508, and the carrier frequency acquisition (frequency pull-in) of the BPSK signal is carried out. Further, the correlation value operation unit 509 performs a calculation of $(I^2+Q^2)$ to obtain the correlation value P and transfers it to the control unit 48 via the control register 472. Further, the navigation message judgment unit 510 obtains the navigation message and transfers it to the control unit 48 via the control register 472.

Further, the DLL 600 has multipliers 601 to 606, LPFs 607 to 610, correlation value operation units 611 and 612, a phase detector (PD) 613, a loop filter 614, a numerically controlled oscillator (NCO) 615, and a PN generator (PNG) 616.

The DLL 600 performs the synchronization processing with the C/A code included in the IF signal. The PN generator 616 independently computes the three correlation levels of a prompt or puncture signal P, an early signal E, and a late signal L and, as shown in FIGS. 17A to 17C, controls the phase so that the level difference of E and L becomes the same (P is the maximum). Note that the start timing of the PN generator 616 detects the correlation with several chips before and after from the search results of the DSP 463 of the acquisition unit 46. Further, the initial value and the limiter value of the NCO 615 are set based on the search results of the DSP 463 of the acquisition unit 46 by the control unit 48 via the control register 472.

The phase detector 613 of the DLL 600 detects a phase difference between the C/A code and the output of the PN generator 616 at an interval of for example 20 ms. The NCO 615 is controlled by the detected phase difference via the loop filter 614 to perform the acquisition (phase pull-in) and thereby to perform the tracking processing. In the detection of the phase difference, as I and Q, use is made of signals on the selected side.

Figure 18A:
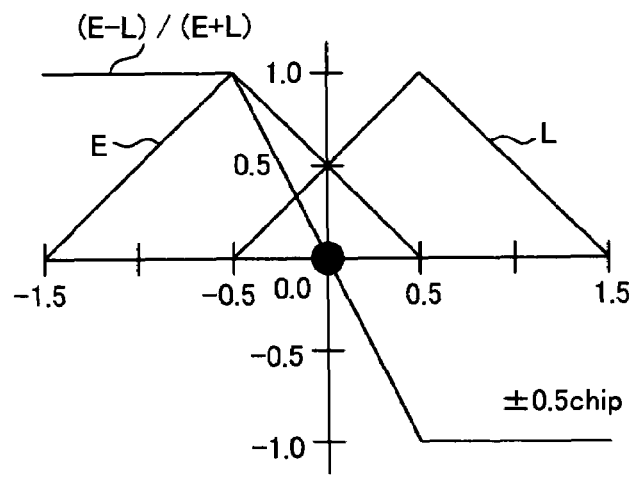
FIGS. 18A and 18B are views of the characteristics of a phase detector of a delay locked loop of the tracking unit according to the present embodiment.
Figure 18B:
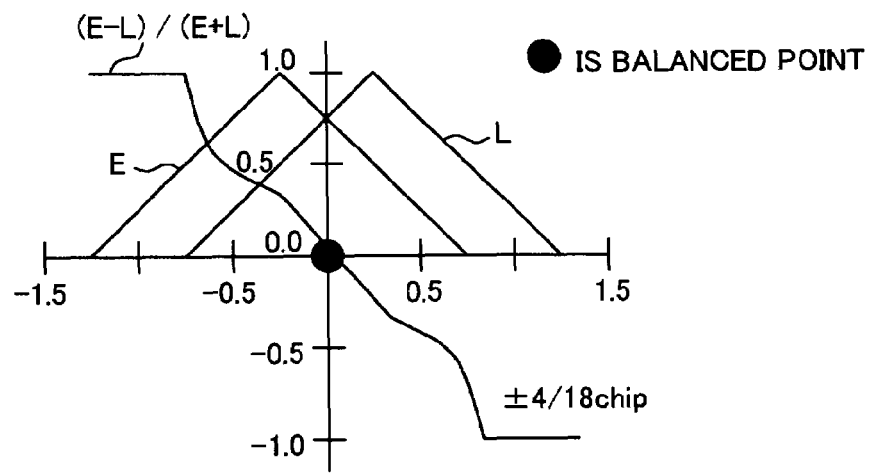

The phase characteristics of the phase detector 613 are shown in FIGS. 18A and 18B. An example where the phase detector 613 shown in FIGS. 18A and 18B performs the calculation by setting for example (E−L)/(E+L) is shown. FIG. 18A shows the characteristic in the case of ±0.5 chip; and FIG. 18B shows the characteristic of a case of ±4/18 chip. In this way, the phase characteristic of the phase detector 613 has a good phase comparison characteristic not depending upon the signal intensity.

The loop filter 614 of the DLL 600 can be configured in the same way as the loop filter 508 of the Costas loop 500 (FIG. 16C). Note that the sampling cycle is 20 ms.

In the DLL 600 having such a configuration, the IF signal is multiplied by the early signal E at the multiplier 601, and the output signal of the multiplier 601 is input to the multipliers 602 and 603. The multiplier 602 is supplied with the in-phase signal I having a predetermined frequency. The low frequency component of the multiplication result is extracted at the LPF 607 and supplied to the correlation value operation unit 611. Further, the multiplier 603 is supplied with the quadrature signal Q having a predetermined frequency. The low frequency component of the multiplication result is extracted at the LPF 608 and supplied to the correlation value operation unit 611. The correlation value operation unit 611 performs the calculation of $(I^2+Q^2)$ to obtain the correlation value E and supplies it to the phase comparator 613. Further, the IF signal is multiplied by the late signal L at the multiplier 604, and the output signal of the multiplier 604 is input to the multipliers 605 and 606. The multiplier 605 is supplied with the in-phase signal I of the predetermined frequency. The low frequency component of the multiplication result is extracted at the LPF 609 and supplied to the correlation value operation unit 612. Further, the multiplier 606 is supplied with the quadrature signal Q having a predetermined frequency. The low frequency component of the multiplication result is extracted at the LPF 620 and supplied to the correlation value operation unit 613. The correlation value operation unit 613 performs the calculation of $(I^2+Q^2)$ to obtain the correlation value L and supplies it to the phase comparator 613. Then, the phase detector 611 detects the phase difference between E and L, feeds back the detection result through the loop filter 614 to the NCO 615, and performs the acquisition (phase pull-in).

Figure 19:
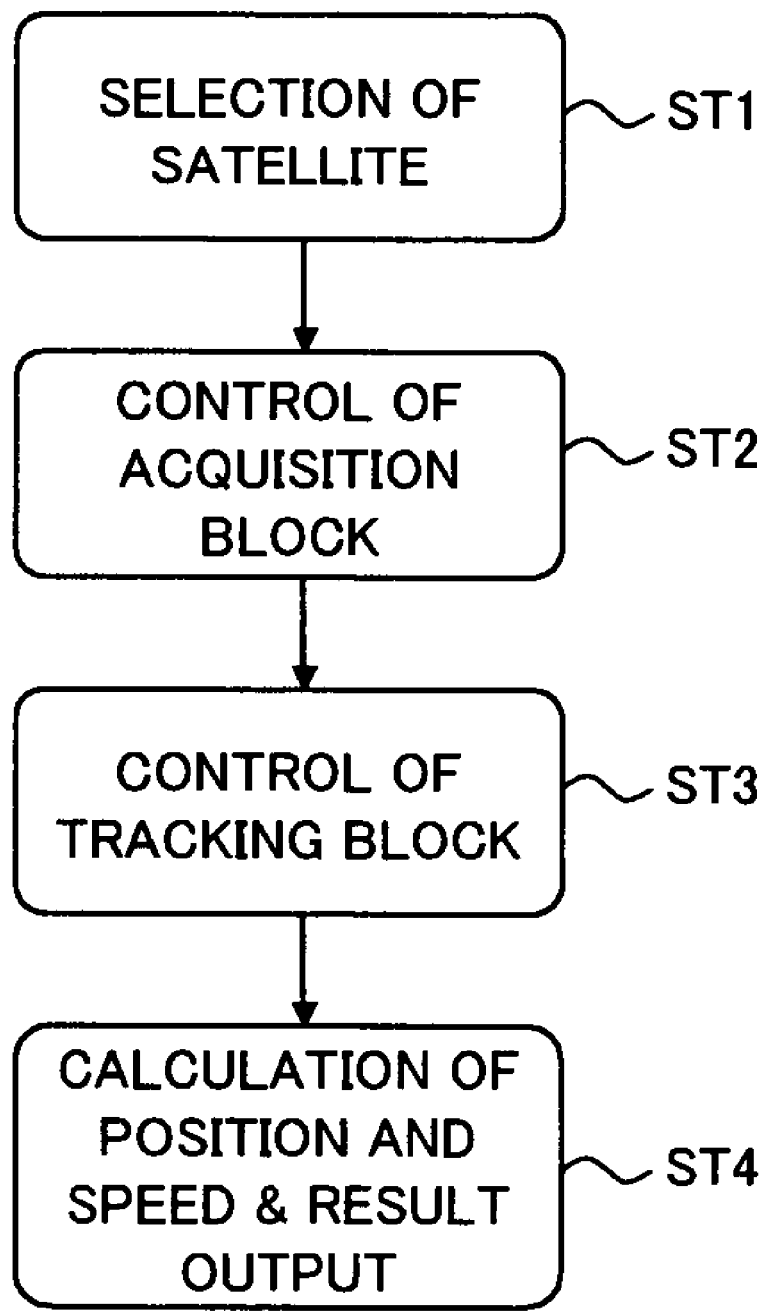
FIG. 19 is a view for briefly explaining the processing of the control unit according to the present embodiment.

The control unit 48 basically performs the processing as shown in FIG. 19. First, at step ST1, the control unit 48 selects the satellite. Concretely, according to the initial state of a cold start, a warm start, or a hot start, it determines the satellite for which synchronization is to be acquired and the algorithm, controls the on/off state of the GPS front end unit 3, adjusts the gain, and obtains the antenna connection information from the GPS front end unit 3. At step ST2, the control unit 48 controls the on/off state of the acquisition unit 46, transfers a program to the acquisition unit 46, transfers the search command and SV information, and transfers various computation commands in accordance with the satellite for which synchronization is to be acquired and the algorithm, obtains the search results of the SV, the phase, the frequency, and the level and various computation results from the acquisition unit 46, and sets the acquisition unit 46 to a standby state. At step ST3, the control unit 48 sets the search results and the computation results of the acquisition unit 46 in the tracking unit 47, controls the on/off state for every channel of the tracking unit 47, controls the tracking, concretely, performs the initial settings, search, synchronization, and interpolation control, and obtains the range data, Doppler shift, navigation message, and time data from the tracking unit 47. Then, at step ST4, the control unit 48 calculates the position and speed from the navigation message and the range data etc. and outputs the results according to the communication format.

Further, the control unit 48 receives the frequency change signal S21 from the mobile phone unit 2 and performs control so as to continuously maintain the tracking of the IF carrier in the tracking processing based on the information of the change of the reference frequency of the reference signal Foxno, for example, the frequency change Δf or DIR or number of bits or other parameters. Further, when the frequency of the reference signal Fox is frequently changed, it becomes difficult to synchronize with the frequency of an RF signal from a GPS satellite found by the acquisition or to find the frequency of a signal from a GPS satellite. Therefore, by giving the frequency change of the reference signal Fox to the acquisition unit and the synchronization unit, the control unit 48 performs control so as to synchronize with the frequency of the signal from the GPS satellite and reliably find the frequency of the signal from the GPS satellite. Further, in order to prevent the frequency of the IF carrier also changing when the frequency of the reference clock RCLK changes during the positioning computation and the synchronization of the received signal and the spread code no longer being able to be held, the control unit 48 outputs a frequency change stop signal S4 to the baseband unit 21 of the mobile phone unit 2 and performs control so as to prevent a change of the frequency until the positioning computation is ended even if the base station 5 of the other party in communication changes and it becomes necessary to change the oscillation frequency of the reference frequency oscillator 23 according to the established protocols. In a cellular system, the oscillation frequency is changed in 2 seconds or more, therefore the positioning operation may be ended during that period.

Figure 20:
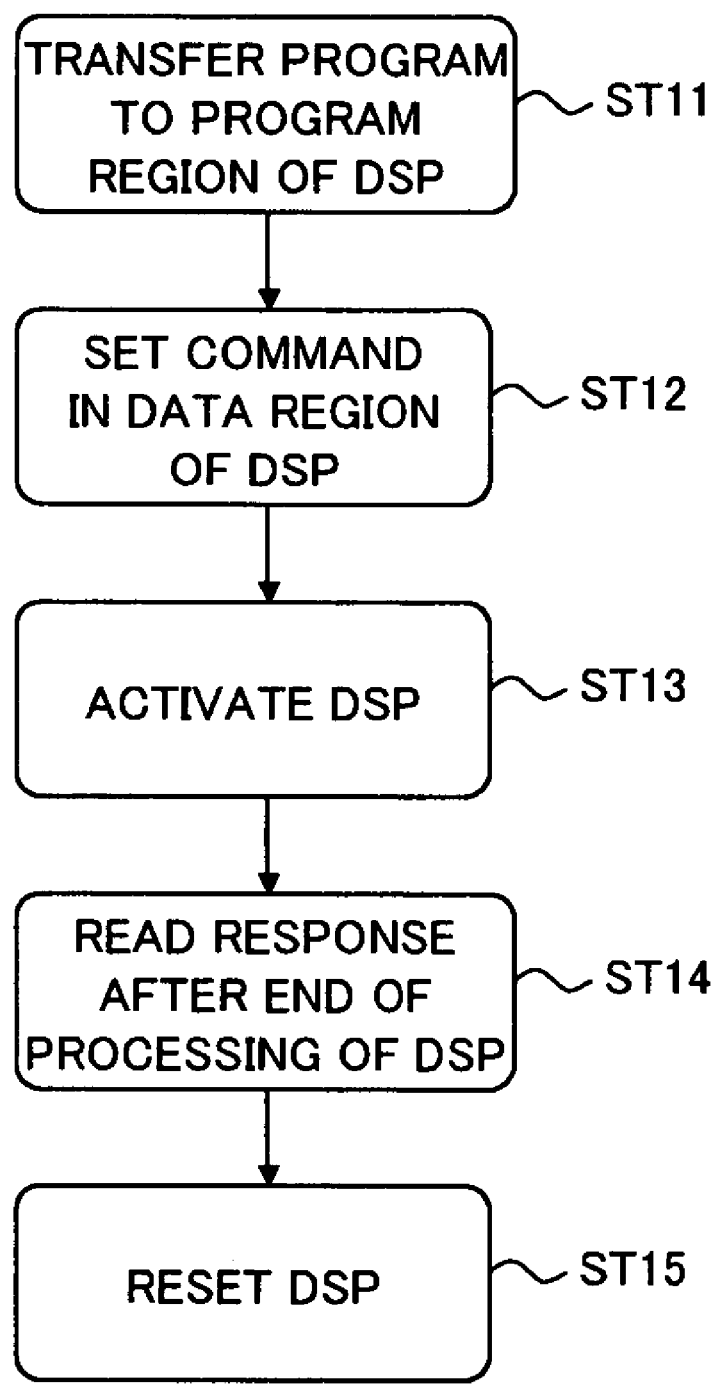
FIG. 20 is a flow chart for briefly explaining the processing with respect to the DSP of the acquisition unit of the control unit according to the present embodiment.

FIG. 20 is a flow chart for briefly explaining the processing with respect to the DSP 463 of the acquisition unit 46 of the control unit 48.

At step ST11, the control unit 48 first selects a DSP program in accordance with the satellite for which synchronization is to be acquired and the algorithm. At step ST12, the control unit 48 sets the required command parameters such as the number of the satellite for which synchronization is to be acquired. At step ST13, the control unit 48 releases the reset of the DSP 463 and activates the DSP 463. At step ST14, the control unit 48 reads the response after the end of the processing of the DSP 463. Then, the control unit 48 resets the DSP 463.

Figure 21:
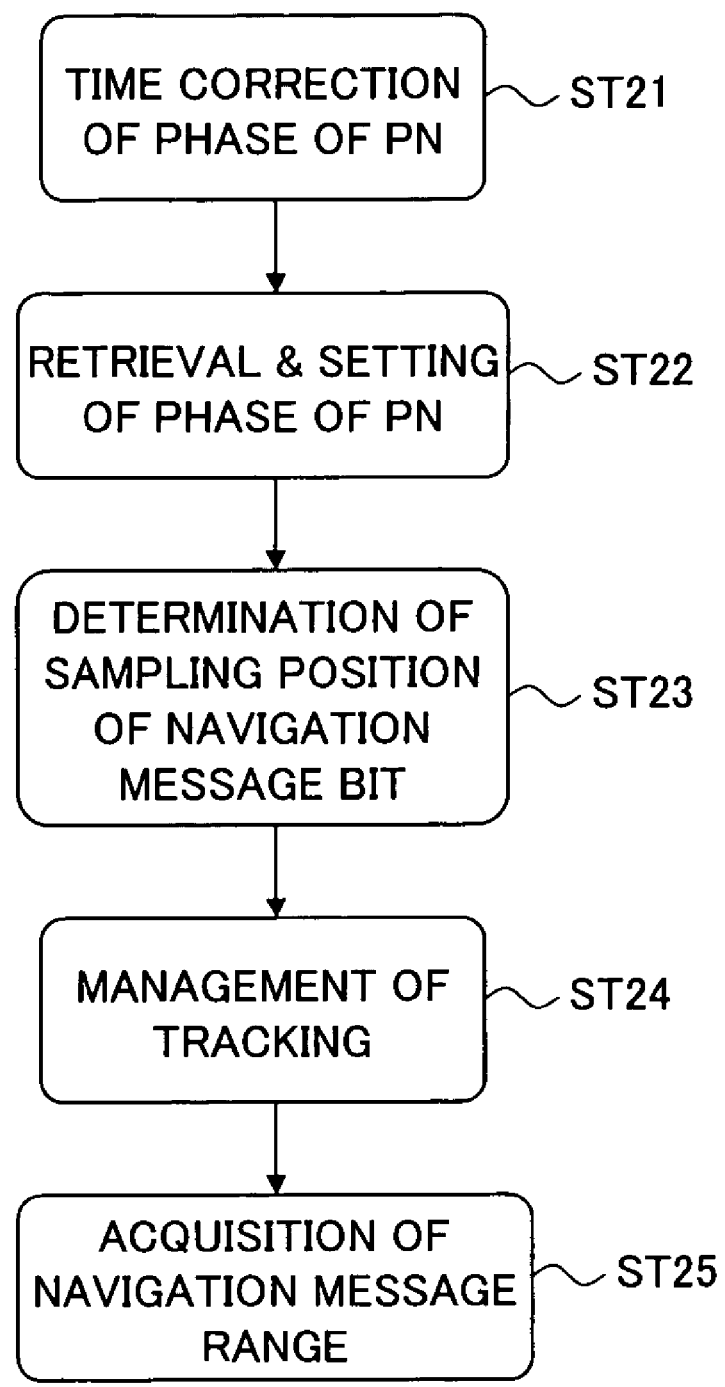
FIG. 21 is a flow chart for briefly explaining the processing with respect to the tracking unit of the control unit according to the present embodiment.

FIG. 21 is a flow chart for briefly explaining the processing with respect to the tracking unit 47 of the control unit 48.

At step ST21, the control unit 48 corrects the phase of PN changed in the time elapsed from when the DSP 463 fetched the data. At step ST22, the control unit 48 detects the peak while shifting the phase of the PN within a range of about 1 chip. At step ST23, the control unit 48 estimates the bit change point of the navigation message and determines the sampling timing of the navigation message. At step ST24, the control unit 48 monitors and manages the state of the tracking. Then, at step ST25, the control unit 48 acquires the navigation message and the range data and hands it over to the position calculation routine.

Next, a brief explanation will be given of the search for the phase of the PN by the control unit 48. Even though the phase of the PN is corrected, as shown in FIGS. 22A to 22C, an error of about ±0.5 chip is generated. For this reason, the phase of the PN is searched for in the following way.

(1) The NCO 615 of the DLL 600 and the NCO 504 of the Costas loop 500 are set at values obtained at the acquisition unit 46, and the PN is reset with the phase of the PN shifted by −0.5 chip from the original phase. At this time, the DLL 600 is turned off, and the NCO 615 of the DLL 600 and the NCO 504 of the Costas loop 500 are not updated.

(2) It is confirmed at that point of time if the correlation can be obtained.

(3) The NCO 615 of the DLL 600 is set at a value advanced by exactly +3/18 chip at 20 ms, and the correlation after 20 ms is confirmed.

(4) The processing of (3) is repeated.

By the above search, when the value is higher than the determined threshold value, it is regarded that the correlation was detected, the DLL 600 is turned on, and the feedback control of the NCO 615 of the DLL 600 and the NCO 504 of the Costas loop 500 is started.

Further, as the processing concerning the NCO 615 of the DLL 600, the control unit 48 calculates a mean value of the NCO 615 and sets the NCO limiter based on that value. For example, the control unit 48 updates the mean value at every 20 ms and sets the limiter value for every second to ±8 of the mean value. As the processing concerning the NCO 504 of the Costas loop 500, the control unit 48 calculates the mean value of the NCO 504 and sets the NCO limiter based on that value. For example, the control unit 48 updates the mean value at every 20 ms and sets the limiter value for every second to ±25 Hz of the mean value.

Further, FIGS. 23A and 23B are views for explaining the decoding function of the navigation message (one word) of the control unit 48.

The control unit 48 decodes the navigation message as shown in FIG. 23A. Next, the control unit 48 executes a parity check. The PE bit becomes "1" at the time of a parity error. Further, the control unit 48 executes a preamble check. The PR becomes "1" when the parity is OK and d1 to d8 are 0×8b. Note that when for example the preamble is found, an interruption is caused.

Next, an explanation will be given of the operation centered on the portion concerning the frequency change information of the reference signal Fox.

The baseband unit 21 of the mobile phone unit 2 engages in speech with a close base station 5 or controls the transfer of predetermined data through the transmission and reception antenna 24 in synchronization with the reference signal from the reference frequency oscillator 23. The baseband unit 21 changes the oscillation frequency of the reference frequency oscillator 23 according to the established protocols when the base station 5 of the other party in communication changes by generating a frequency change signal S21 for reporting that the base station has changed and the frequency is to be changed and outputting it to the D/A converter 22 and the control unit 48 of the GPS baseband unit 4. At this time, the baseband unit 21 uses a serial, IO, or interrupt function to output information of the reference frequency changing, for example, the frequency change Δf or DIR or number of bits or other parameters as the frequency change signal S21.

The D/A converter 22 converts the digital frequency change signal S21 from the baseband unit 21 to an analog signal and outputs it to the reference frequency oscillator 23. The reference frequency oscillator 23 supplies the reference signal Fox using for example 13 MHz ±0.1 ppm as the reference oscillation frequency f to the baseband unit 21 and the clock generation unit 41 of the GPS baseband unit 4. The reference frequency oscillator 23 changes the oscillation frequency by exactly Δf (for example 0.7 Hz) according to the frequency change instruction of the analog frequency change signal S21 from the D/A converter 22 and supplies the reference signal Fox of frequency f+Δf after the change to the baseband unit 21 and the clock generation unit 41 of the GPS baseband unit 4.

Here, for example, the control unit 48 of the GPS baseband unit 4 determines the satellite for which synchronization is to be acquired and the algorithm in accordance with the initial state of the cold state, warm state, or hot state, controls the on/off state of the GPS front end unit 3, adjusts the gain, etc.

The GPS front end unit 3 receives the radio RF signal from the GPS satellite having a frequency of 1575.42 MHz at the antenna 101. The received RF signal is amplified at the low noise amplifier 32, stripped of any signals out of the GPS signal band at the BPF 33 serving as the SAW filter, and input via the amplifier 34 to the mixer 36. Then, the mixer 36 mixes it with the oscillation signal S35 from the frequency synthesizer 35. An IF signal S38 having a frequency of 1.023 MHz is extracted through the amplifier 37 and the LPF 38. The IF signal S38 is converted to a digital signal at the binary-coded circuit 39 and output as the one-bit serial signal IF signal S39 to the GPS baseband unit 4.

The GPS baseband unit 4 receives the reference signal Fox having a frequency of 13 MHz (or ±0.7 Hz) from the mobile phone unit 2 and outputs a reference clock RCLK of the frequency 13 MHz as it is or generates a clock obtained by multiplying or dividing the reference signal Fox. Then, based on these clocks, it receives the IF signal S39 from the GPS front end unit 3, performs acquisition for finding the synchronization point initially or when the system largely deviates from the synchronized state, controls the delay difference to be sufficiently smaller in value than one chip length of the spread code after the acquisition, and performs tracking for establishing synchronization of the C/A code and carrier.

The DSP 463 of the acquisition unit 46 uses the frequency change information of the reference signal Fox from the control unit 48 to determine a clock stable area AST other than a margin area AMG set in advance in the area where the frequency of the reference signal Fox changes, that is, the clock unstable area AUS, and uses the IF data in the RAM 462 at that frequency for a frequency search. Namely, the DSP 463 is controlled so as to reliably find the frequency of a satellite by the control unit 48 using the certain time-wise stable area for the frequency search of a satellite. Further, the DSP 463 receives the frequency change Δf of the reference signal Fox from the control unit 48 and searches for the frequency of the satellite at the frequency before the frequency change of the reference signal Fox after the frequency change of the reference signal Fox. Namely, the DSP 463 is controlled so as to perform the frequency search of the satellite over a long time by the control unit 48 using two or more clock stable areas AST for the frequency search. When the frequency of the reference signal Fox changes after the frequency search of a satellite, the DSP 463 establishes synchronization of frequency of the satellite by transmitting the change f+Δf to the tracking unit 47.

The control unit 48 of the GPS baseband unit 4 receives the frequency change signal S21 from the mobile phone unit 2 and, based on the information that the reference frequency changes, for example, the frequency change Δf or DIR or the number of bits or other parameters, performs control so as to continuously maintain the tracking of the IF carrier in the tracking processing. For example, when the frequency of the reference signal Fox of the mobile phone unit 2 does not change, the control unit 48 does not receive the frequency change signal S21, and there is no frequency change information, the tracking unit 47 is set with control information in the control register 472 by the control unit 48 and controlled so as to operate divided into the group of loop units (471-1 to 471-N/3) for the currently synchronized frequency f and the groups of loop units (471-N/3+1 to 471-2N/3, 471-2N/3+1 to 471-N) for the frequency Δfs of the ± change from the currently synchronized frequency f (scalar multiple of change). Due to this, where the frequency changes, it is possible to synchronize the loop units in either the ± frequency band with respect to f, and it is possible to continuously track the satellite. When the change of the frequency including also ± is known, the loop units do not need to be divided into a plurality of groups.

Further, when the frequency of the reference signal Fox from the mobile phone unit 2 changes, the control unit 48 receives a frequency change signal S21, and there is frequency change information, the tracking unit 47 is set with control information in the control register 472 by the control unit 48 and is controlled to operate divided into the groups of loop units (471-1 to 471-N/2, 471-N/2+1 to 471-N) for the frequency Δfs of the ± change from the currently synchronized frequency f excluding the currently synchronized frequency f band (scalar multiple of change). Due to this, when the frequency changes, it is possible to synchronize the loop units in either the ± frequency band with respect to f, it is is possible to continuously track the satellite, and it is possible to reduce the number of channels.

The control unit 48 performs the processings of the positioning computation, the position search, etc. based on the range data, the Doppler shift, the navigation message, and the time obtained by the above tracking processing. The control unit 48 prevents the frequency of the IF carrier changing when the frequency of the reference clock RCLK changes and the synchronization of the received signal and the spread code no longer being able to be held during the positioning computation by outputting the frequency change stop signal S4 to the baseband unit 21 of the mobile phone unit 2. Due to this, the mobile phone unit 2 is controlled so as not to change the frequency until the positioning operation is ended even if the base station 5 of the other party in communication changes and it becomes necessary to changing the oscillation frequency of the reference frequency oscillator 23 according to the established protocols. In a cellular system, the oscillation frequency is changed in 2 seconds or more, therefore the positioning computation may be ended during that time.

As explained above, according to the present embodiment, in order to change the oscillation frequency of the reference frequency oscillator 23 according to the established protocols if the base station 5 of the other party in communication changes, a frequency change signal S21 for reporting that the base station has changed and the frequency is to be changed is generated and output to the control unit 48 of the GPS baseband unit 4. When not receiving the frequency change signal S21, the control unit 48 causes the tracking unit 47 to operate divided into three groups of loop units of the group of loop units for the currently synchronized frequency f and groups of loop units for the frequency f±Δfs of the ± change, while when receiving the frequency change signal S21, the control unit 48 causes the tracking unit 47 to operate divided into the two groups of loop units of the groups of loop units for the frequency f±Δfs of the ± change excluding the currently synchronized frequency f band. Therefore, there are the advantages that, when the frequency changes, it is possible to synchronize the loop units in either the ± frequency band with respect to f, it is possible to continuously track a satellite, and it is possible to reduce the number of channels. Namely, according to the present embodiment, not only can an increase of the module size and cost be prevented, but also, even if the oscillation frequency of the reference frequency oscillator changes, the synchronization of the frequency with the satellite can be established, and the tracking of the IF carrier can be continuously held.

Further, the control unit 48 performs control so that, during the positioning computation, the frequency change stop signal S4 is output to the baseband unit 21 of the mobile phone unit 2 and a change of the frequency change is prevented until the positioning computation is ended even if the base station 5 of the other party in communication changes and it becomes necessary to change the oscillation frequency of the reference frequency oscillator 23 according to the established protocols. Therefore, the frequency of the IF carrier changing when the frequency of the reference clock RCLK changes and the synchronization of the received signal and the spread code no longer being able to be held can be prevented.

Further, according to the present embodiment, at the DSP 463 of the acquisition unit 46, by using a certain time-wise stable area for the frequency search of a satellite, it becomes possible to reliably find the frequency of a satellite. Further, at the DSP 463, by receiving the frequency change Δf of the reference signal Fox from the control unit 48, performing a frequency search of a satellite at the frequency before the frequency change of the reference signal Fox after the frequency change of the reference signal Fox, and using two or more clock stable regions AST for the frequency search of the satellite, it is possible to perform the frequency search of the satellite over a long time. Further, when the frequency of the reference signal Fox changes after the frequency search of the satellite, the DSP 463 can establish synchronization of the frequency with the satellite by transmitting the change f+Δf to the tracking unit 47.

Summarizing the effects of the invention, as explained above, according to the present invention, there are the advantages that not only can increases of the module size and cost be prevented, but also, even if the oscillation frequency of the reference frequency oscillator changes, synchronization of the frequency with a satellite can be established and tracking of the carrier can be continuously maintained.

While the invention has been described with reference to specific embodiments chosen for purpose of illustration, it should be apparent that numerous modifications could be made thereto by those techniqueed in the art without departing from the basic concept and scope of the invention.

What is claimed is:

1. A communication device for demodulating a received signal by a spread code, comprising:
   an oscillator for outputting a reference signal having an oscillation frequency changing by exactly a predetermined frequency in accordance with communication conditions;
   a tracking unit having a plurality of loop units for performing tracking processing for said received signal based on the reference signal of said oscillator; and
   a control unit for monitoring whether or not the oscillation frequency of said oscillator changes and setting the synchronization frequency of each of said plurality of loop units of said tracking unit in accordance with an existence of the change of the frequency,
   wherein, when there is no information of a frequency change, the tracking unit divides said plurality of loop units into three groups of loop units, one loop unit performing tracking processing at a currently synchronized frequency, and when there is information of a frequency change, the tracking unit divides said plurality of loop units into two groups of loop units, neither of which performs tracking processing at the currently synchronized frequency.

2. A communication device as set forth in claim 1, wherein said tracking unit extracts predetermined data included in the received signal and outputs it to said control unit, and said control unit performs predetermined computation processing with respect to said extracted data and stops the frequency change of the oscillation frequency of said oscillator during the computation processing.

3. A communication device comprising:
   a first communication unit device including an oscillator for outputting a reference signal having an oscillation frequency changing by exactly a predetermined frequency in accordance with communication conditions and outputting a frequency change signal when the oscillation frequency of the oscillator is to be changed and a second communication unit for demodulating a received signal by a spread code,
   wherein said second communication unit includes a tracking unit having a plurality of loop units for performing tracking processing for said received signal based on the reference signal of said oscillator of said first communication unit and a control unit for monitoring whether or not the oscillation frequency of the oscillator changes according to an input state of said frequency change signal by said first communication unit and setting the synchronization frequency of each of said plurality of loop units of said tracking unit in accordance with an existence of a change of the frequency, wherein, when there is no information of a frequency change, the tracking unit divides said plurality of loop units into three groups of loop units, one loop unit performing tracking processing at a currently synchronized frequency, and when there is information of a frequency change, the tracking unit divides said plurality of loop units into two groups of loop units, neither of which performs tracking processing at the currently synchronized frequency.

4. A communication device as set forth in claim 3, wherein said tracking unit extracts predetermined data included in the received signal and outputs it to said control unit, and said control unit performs predetermined computation processing with respect to said extracted data and outputs a signal for instructing a stop of the frequency change of the oscillation frequency of said oscillator during the computation processing.

* * * * *